United States Patent
Watanabe et al.

(10) Patent No.: US 8,412,892 B2
(45) Date of Patent: Apr. 2, 2013

(54) STORAGE SYSTEM AND OWNERSHIP CONTROL METHOD FOR STORAGE SYSTEM

(75) Inventors: Koji Watanabe, Chigasaki (JP); Toshiya Seki, Odawara (JP); Takashi Sakaguchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 239 days.

(21) Appl. No.: 12/741,482

(22) PCT Filed: Apr. 21, 2010

(86) PCT No.: PCT/JP2010/002888
§ 371 (c)(1),
(2), (4) Date: May 5, 2010

(87) PCT Pub. No.: WO2011/132222
PCT Pub. Date: Oct. 27, 2011

(65) Prior Publication Data
US 2012/0005430 A1    Jan. 5, 2012

(51) Int. Cl.
*G06F 13/10* (2006.01)
(52) U.S. Cl. . 711/154; 711/118; 711/147; 711/E12.002; 713/1; 713/100

(58) Field of Classification Search .................. 711/154, 711/118, 147, E12.002; 713/1, 100
See application file for complete search history.

(56) References Cited

U.S. PATENT DOCUMENTS

| 6,675,268 B1 | 1/2004 | Dekoning et al. |
| 2006/0236052 A1 | 10/2006 | Minowa |
| 2010/0325339 A1* | 12/2010 | Ogawa et al. .................. 711/103 |

FOREIGN PATENT DOCUMENTS

| JP | 2006-285778 A | 10/2006 |
| WO | 02/19111 A2 | 3/2002 |

\* cited by examiner

*Primary Examiner* — Edward Dudek, Jr.
(74) *Attorney, Agent, or Firm* — Mattingly & Malur, PC

(57) ABSTRACT

Access to various types of resources is controlled efficiently, thereby enhancing the throughput. A storage system includes: a disk device for providing a volume for storing data to a host system; a channel adapter for writing data from the host system to the disk device via a cache memory; a disk adapter for transferring data to and from the disk device; and at least one processor package including a plurality of processors for controlling the channel adapter and the disk adapter; wherein any one of the processor packages includes a processor for incorporatively transferring related types of ownership based on specific control information for managing the plurality of types of ownership for each of the plurality of types of resources.

9 Claims, 39 Drawing Sheets

| LDEV NUMBER | PROCESSOR PACKAGE NUMBER |
|---|---|
| 0 | 0 |
| 1 | 2 |
| 2 | 0 |
| ... | ... |
| 65535 | 2 |
| | |

FIG.12

ENTITY INFORMATION

| LDEV NUMBER | 0 | 1 | 2 | 3 | ... | 65535 |
|---|---|---|---|---|---|---|
| PROCESSOR PACKAGE NUMBER | 0 | 2 | 0 | 2 | | 2 |

| CVDEV NUMBER | 0 | 1 | 2 | 3 | ... | 65535 |
|---|---|---|---|---|---|---|
| PROCESSOR PACKAGE NUMBER | 0 | 2 | 0 | 2 | | 2 |

| EXTERNAL VOLUME NUMBER | 0 | 1 | 2 | 3 | ... | 65535 |
|---|---|---|---|---|---|---|
| PROCESSOR PACKAGE NUMBER | 0 | 2 | 0 | 2 | | 2 |

| JOURNAL GROUP NUMBER | 0 | 1 | 2 | 3 | ... | 4095 |
|---|---|---|---|---|---|---|
| PROCESSOR PACKAGE NUMBER | 0 | 2 | 0 | 2 | | 2 |

| SESSION NUMBER | 0 | 1 | 2 | 3 | ... | 4095 |
|---|---|---|---|---|---|---|
| PROCESSOR PACKAGE NUMBER | 0 | 2 | 0 | 2 | | 2 |

| FRONT-END PORT | 0 | 1 | 2 | 3 | ... | 4095 |
|---|---|---|---|---|---|---|
| PROCESSOR PACKAGE NUMBER | 0 | 2 | 0 | 2 | | 2 |

| BACK-END PORT | 0 | 1 | 2 | 3 | ... | 4095 |
|---|---|---|---|---|---|---|
| PROCESSOR PACKAGE NUMBER | 0 | 2 | 0 | 2 | | 2 |

FIG.13

REFERENCE INFORMATION

| LDEV NUMBER | 0 | 1 | 2 | 3 | ... | 65535 |
|---|---|---|---|---|---|---|
| PROCESSOR PACKAGE NUMBER | 0 | 2 | 0 | 2 | | 2 |

| CVDEV NUMBER | 0 | 1 | 2 | 3 | ... | 65535 |
|---|---|---|---|---|---|---|
| PROCESSOR PACKAGE NUMBER | 0 | 2 | 0 | 2 | | 2 |

| EXTERNAL VOLUME NUMBER | 0 | 1 | 2 | 3 | ... | 65535 |
|---|---|---|---|---|---|---|
| PROCESSOR PACKAGE NUMBER | 0 | 2 | 0 | 2 | | 2 |

| JOURNAL GROUP NUMBER | 0 | 1 | 2 | 3 | ... | 4095 |
|---|---|---|---|---|---|---|
| PROCESSOR PACKAGE NUMBER | 0 | 2 | 0 | 2 | | 2 |

| SESSION NUMBER | 0 | 1 | 2 | 3 | ... | 4095 |
|---|---|---|---|---|---|---|
| PROCESSOR PACKAGE NUMBER | 0 | 2 | 0 | 2 | | 2 |

| FRONT-END PORT | 0 | 1 | 2 | 3 | ... | 4095 |
|---|---|---|---|---|---|---|
| PROCESSOR PACKAGE NUMBER | 0 | 2 | 0 | 2 | | 2 |

| BACK-END PORT | 0 | 1 | 2 | 3 | ... | 4095 |
|---|---|---|---|---|---|---|
| PROCESSOR PACKAGE NUMBER | 0 | 2 | 0 | 2 | | 2 |

FIRST STATE: BEFORE TRANSFER OF OWNERSHIP

SECOND STATE: OWNERSHIP BEING TRANSFERRED

THIRD STATE: AFTER TRANSFER OF OWNERSHIP

FIG.33

| LDEV NUMBER | 0 | 1 | 2 | 3 | ... | 65535 |
|---|---|---|---|---|---|---|
| PROCESSOR PACKAGE NUMBER | 0 | 2 | 0 | 2 | | 2 |
| REAL OWNERSHIP | 0 | 1 | 0 | 1 | | 0 |
| PRELIMINARY OWNERSHIP | 0 | 2 | 2 | 0 | | 2 |

| CVDEV NUMBER | 0 | 1 | 2 | 3 | ... | 65535 |
|---|---|---|---|---|---|---|
| PROCESSOR PACKAGE NUMBER | 0 | 2 | 0 | 2 | | 2 |
| REAL OWNERSHIP | 0 | 1 | 0 | 1 | | 0 |
| PRELIMINARY OWNERSHIP | 0 | 2 | 2 | 0 | | 2 |

| EXTERNAL VOLUME NUMBER | 0 | 1 | 2 | 3 | ... | 65535 |
|---|---|---|---|---|---|---|
| PROCESSOR PACKAGE NUMBER | 0 | 2 | 0 | 2 | | 2 |
| REAL OWNERSHIP | 0 | 1 | 0 | 1 | | 0 |
| PRELIMINARY OWNERSHIP | 0 | 2 | 2 | 0 | | 2 |

| JOURNAL GROUP NUMBER | 0 | 1 | 2 | 3 | ... | 4095 |
|---|---|---|---|---|---|---|
| PROCESSOR PACKAGE NUMBER | 0 | 2 | 0 | 2 | | 2 |
| REAL OWNERSHIP | 0 | 1 | 0 | 1 | | 0 |
| PRELIMINARY OWNERSHIP | 0 | 2 | 2 | 0 | | 2 |

| SESSION NUMBER | 0 | 1 | 2 | 3 | ... | 4095 |
|---|---|---|---|---|---|---|
| PROCESSOR PACKAGE NUMBER | 0 | 2 | 0 | 2 | | 2 |
| REAL OWNERSHIP | 0 | 1 | 0 | 1 | | 0 |
| PRELIMINARY OWNERSHIP | 0 | 2 | 2 | 0 | | 2 |

| FRONT-END PORT | 0 | 1 | 2 | 3 | ... | 4095 |
|---|---|---|---|---|---|---|
| PROCESSOR PACKAGE NUMBER | 0 | 2 | 0 | 2 | | 2 |
| REAL OWNERSHIP | 0 | 1 | 0 | 1 | | 0 |
| PRELIMINARY OWNERSHIP | 0 | 2 | 2 | 0 | | 2 |

| BACK-END PORT | 0 | 1 | 2 | 3 | ... | 4095 |
|---|---|---|---|---|---|---|
| PROCESSOR PACKAGE NUMBER | 0 | 2 | 0 | 2 | | 2 |
| REAL OWNERSHIP | 0 | 1 | 0 | 1 | | 0 |
| PRELIMINARY OWNERSHIP | 0 | 2 | 2 | 0 | | 2 |

FIG.44

| PROCESSOR PACKAGE NAME | MP PK0 | MP PK1 | MP PK2 | MP PK3 | MP PK4 | MP PK5 | MP PK6 | MP PK7 |
|---|---|---|---|---|---|---|---|---|
| RETAINED AMOUNT INFORMATION | 10 | 11 | 9 | 12 | 13 | 10 | 8 | 12 |
| INHIBITION INFORMATION | PERMITTED | PERMITTED | INHIBITED | PERMITTED | PERMITTED | PERMITTED | PERMITTED | PERMITTED |

| PROCESSOR PACKAGE NAME | MP PK0 | MP PK1 | MP PK2 | MP PK3 | MP PK4 | MP PK5 | MP PK6 | MP PK7 |
|---|---|---|---|---|---|---|---|---|
| RETAINED AMOUNT INFORMATION | 10 | 11 | 8 | 12 | 13 | 10 | 8 | 12 |

| PROCESSOR PACKAGE NAME | MP PK0 | MP PK1 | MP PK2 | MP PK3 | MP PK4 | MP PK5 | MP PK6 | MP PK7 |
|---|---|---|---|---|---|---|---|---|
| OWNERSHIP TRANSFER | PERMITTED | PERMITTED | INHIBITED | PERMITTED | PERMITTED | PERMITTED | PERMITTED | PERMITTED |

56

STORAGE SYSTEM AND OWNERSHIP CONTROL METHOD FOR STORAGE SYSTEM

TECHNICAL FIELD

The present invention relates to a storage system and an ownership control method for the storage system. Particularly, the invention is suited for use in a storage system relating to an ownership control technique for accessing a plurality of types of resources.

BACKGROUND ART

A conventional storage system provides a host computer with volumes as storage areas, according to the RAID (Redundant Arrays of Inexpensive Disks) configuration, by using a plurality of hard disk drives. The conventional storage system has dual controllers, each of which is equipped with multiple processors. These processors control the operation of the system based on the stored control information, and this control information is stored in shared memory so that it can be accessed by the multiple processors.

If the control information is stored in the shared memory as described above, it is necessary to access by utilizing several processors instead of a single processor, therefore, time to access the share memory becomes longer than time to access a local memory, this creates a bottleneck in enhancing the throughput of host command processing. Therefore, the usual configuration is to copy the control information, to a local memory located near the processor for a conventional storage system (see Patent Literature 1).

CITATION LIST

Patent Literature

PTL 1
Japanese Patent Laid-Open (Kokai) Application Publication No. 2006-285778

SUMMARY OF INVENTION

Technical Problem

However, even if the control information is located in the local memory as described above, there is a possibility that access time may still be too long in the conventional storage system because the access still requires multiple processors. Furthermore, efficient access times for the entire conventional storage system cannot be achieved unless both the utilization of local memory, and also the utilization of other resources such as the aforementioned volumes are employed.

In a conventional storage system, access by the processors to resources such as the aforementioned volumes is restricted. If it is necessary to, for example, access multiple types of resources, the processors on which restrictions are placed upon may have to separately access different types of resources. However, control of access to the resources by the multiple processors may become more complicated than what is ideal. Therefore, there is demand for a more efficient method of access to the multiple types of resources in a conventional storage system.

The present invention was devised in light of the circumstances described above, and it is an object of the invention to provide a storage system and an ownership control method for a storage system, that can efficiently control access to a plurality of types of resources and thereby enhance the throughput.

Solution to Problem

In order to solve the above-described problem, the present invention provides a storage system including: a disk device for providing a volume for storing data to a host system; a channel adapter for writing data from the host system to the disk device via a cache memory; a disk adapter for transferring data to and from the disk device; and at least one processor package for controlling the channel adapter and the disk adapter; wherein the processor package includes a processor for incorporatively transferring related types of ownership based on specific control information for managing the plurality of types of ownership for each of the plurality of types of resources.

Furthermore, the present invention provides an ownership control method for a storage system including: a disk device for providing a volume for storing data to a host system; a channel adapter for writing data from the host system to the disk device via a cache memory; a disk adapter for transferring data to and from the disk device; and at least one processor package including a plurality of processors for controlling the channel adapter and the disk adapter; wherein any one of the plurality of processors executes a cooperative transfer step for incorporatively transferring related types of ownership based on specific control information for managing the plurality of types of ownership for each of the plurality of types of resources.

Advantageous Effects of Invention

According the present invention, it is possible to efficiently control access to a plurality of types of resources, thereby enhancing the throughput.

BRIEF DESCRIPTION OF DRAWINGS

FIG. 12 shows an example of entity information in an ownership management table.

FIG. 13 shows an example of reference information in the ownership management table.

FIG. 33 shows an example of an ownership management table for preliminary/real ownership.

FIG. 44 shows an example of the content of an ownership weight table.

FIG. 45 shows an example of the content of the ownership weight table.

FIG. 46 shows an example of the content of the ownership weight table containing the setting for inhibiting ownership transfer.

DESCRIPTION OF EMBODIMENTS

An embodiment of the present invention will be explained with reference to the attached drawings.

(1) Concept of the Present Embodiment and Storage System to which the Concept is Applied (1-1) Concept of the Present Embodiment A storage system reflecting the current present embodiment adopts the concept of ownership to access a retained or added resource, thereby controlling access to this resource. Multiple types of resources exist in the present embodiment; and if ownerships to these resources are to be transferred, the related ownerships are transferred relative to each other. These resources may sometimes be expressed as devices hereinafter and will be described more specifically later.

(1-2) Configuration of Storage System

Figure 1:
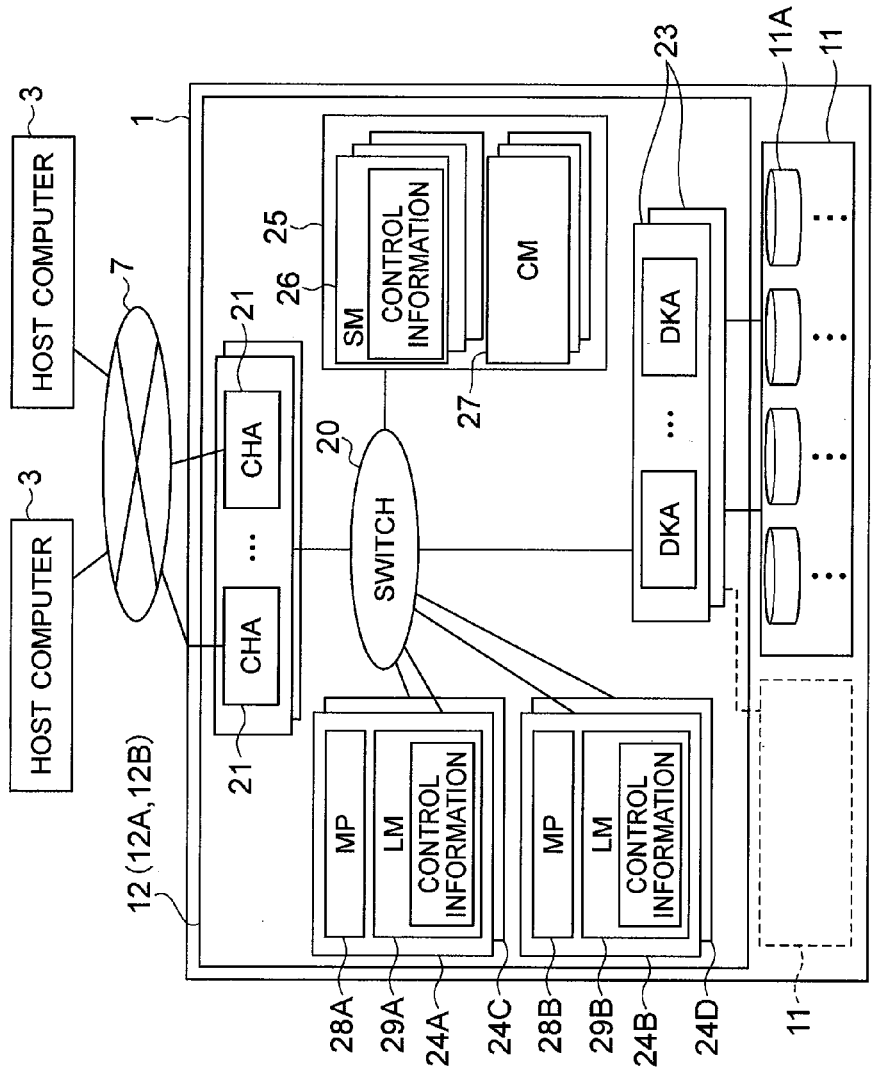
FIG. 1 is a block diagram showing the schematic configuration of a storage system in the present embodiment.

FIG. 1 shows the schematic configuration of a disk array system 1 according to the present embodiment. The disk array system 1 includes a disk unit 11 for providing a host computer 3 with a volume for storing data, and a disk controller 12 for controlling the disk unit 11. The disk unit 11 and the disk controller 12 are connected via disk adapters 23 (corresponding to DKAs in FIG. 1).

(1-3) Configuration of Disk Unit

The disk unit 11 includes at least one hard disk drive 11A (multiple disk drives are displayed in the example shown in FIG. 1) as a storage medium, a switch 20, and a drive circuit (not shown) for controlling the hard disk drive 11A. Incidentally, the hard disk drive 11A is abbreviated as HDD in the drawing. The disk unit 11 may also be equipped with a solid state memory device such as a flash memory instead of the hard disk drive 11A described above.

The disk unit 11 is connected to the disk controller 12 via its built-in switch 20. Multiple sets of disk units 11 can be connected in various configurations by using several switches 13. Each switch 20 includes an expander. A connection map defines the form in which the disk unit 11 is connected to the disk controller 12.

The hard disk drives 11A mounted in the disk unit 11 constitute a RAID group according to the so-called RAID (Redundant Arrays of Inexpensive Disks) configuration and each hard disk drive 11A is accessed under the RAID control. The RAID group configuration may be extend across a configuration of several disk units 11. All hard disk drives 11A belonging to the same RAID group are recognized as one virtual logical device by the host computer 3.

(1-2) Configuration of Disk Controller

The disk controller 12 is a system component for controlling the entire disk array system 1 and its main role is to execute input-output processing on the disk unit 11 in response to an access request from the host computer 3. The disk controller 12 executes processing relating to the management of the disk array system 1 in response to various requests from a service processor (SVP) (not shown).

The disk controller 12 includes channel adapters (CHA) 21, a switch 20, a disk adapter (DKA) 23, at least one processor package 24A to 24D, and a memory 25. Each component contained in the disk controller 12 is duplicated due to the viewpoint of fault tolerance, thus disk controller 12 can access the disk unit 11 through multiple channels (connection paths).

The channel adapter 21 is an interface for connection with the host computer 3 via a network 7 and controls data communication with the host computer 3 on specific protocol. For example, when receiving a write command from the host computer 3, the channel adapter 21 enters the write command and the relevant data to each memory 25 via the switch 20 and the cache memory 27. Overall, the channel adapter 21 writes the data from the host computer 3 to the disk unit 11 via the cache memory 27. The channel adapter 21 may sometimes be called a host interface or front-end interface.

The switch 20 is an interface between the components in the disk controller 12 and controls data transmission and reception between the components.

The disk adapter 23 is an interface for connection with the disk unit 11. The disk adapter 23 transfers data to and from the disk unit 11 according to specified protocol in accordance with an I/O command from the host computer 3.

For example, when receiving a write command, the disk adapter 23 accesses the disk unit 11 in order to destage data on the memory (such as 25), which is designated by the write command, to the disk unit 11 (that is, a specified storage area in the hard disk drive 11A). When each controller for the disk adapter 23 receives a read command, the disk adapter 23 accesses the disk unit 11 in order to destage data on the disk unit 11, which is designated by the read command, to the memory 25.

The disk adapter 23 implements a failure recovery function in addition to the above-mentioned I/O function. These functions are implemented as, for example, firmware. The disk adapter 23 may sometimes be called a disk interface or back-end interface.

Each processor package 24A to 24D includes a processor. The processors control the entire disk array system 1 by executing various control programs loaded onto the memory (such as 25) and controlling the operation of the disk controller 12. Each processor package 24A to 24D may be equipped with an internal memory capable of storing, for example, parameter information described later. Incidentally, since the processor packages 24A to 24D have configurations similar to each other, the processor package 24A is selected as an example in the following explanation. Also, since the multiple memories 25 use the duplex configuration, the single memory 25 will be mainly focused in the following explanation.

The memory 25 functions as a main memory for the processor package 24A and also as a cache memory for the channel adapter 21 and the disk adapter 23. The memory 25 is composed of, for example, a volatile memory such as a DRAM (Dynamic RAM) or a nonvolatile memory such as a flash memory. The memory 25 stores system configuration information for the disk array system 1 itself. The system configuration information contains logical volume configuration information, RAID configuration information, a connection path map, and a connection path reconstruction table. The logical volume configuration information contains information about whether an external volume provided by an added disk unit 11 exists or not, as well as information about the number of LDEVs. For example, when the disk array system 1 is powered on, the system configuration information is read from a specified storage area in accordance with an initial process and loaded onto the memory 25 under the control of the processor package 24A.

The service processor (hereinafter sometimes referred to as SVP) has a function managing the entire disk array system 1. The service processor according to the present embodiment is configured so that it is built in the disk controller 12; however, instead of the above-described configuration, the service processor may be configured so that a management device is connected via a management network (not show) externally to the disk controller 12.

A system administrator may give a command via the service processor to the disk controller 12, thereby making it possible to refer to the system configuration information for the disk array system 1 or set or change this system configuration information. For example, along with the addition of the hard disk drive 11A, the system administrator can set a logical volume and a virtual volume and set the RAID configuration via the service processor.

(2) Each Element of Disk Controller (2-1) Processor Package

Figure 2:
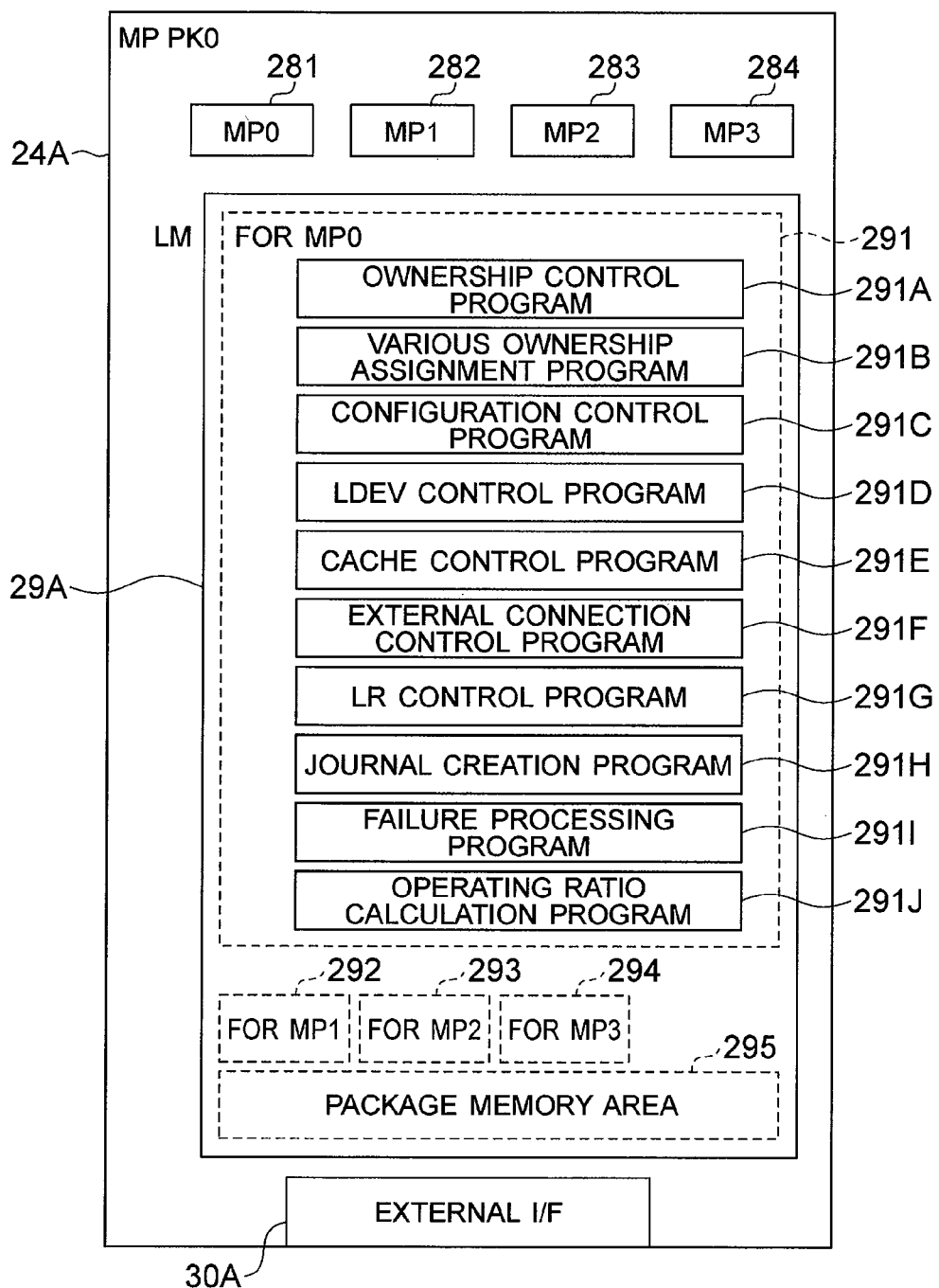
FIG. 2 shows a configuration example for a processor package.

FIG. 2 shows a configuration example for the processor package 24A shown in FIG. 1. The processor package 24A includes four processors 281 to 284 as the aforementioned processor 28A, a local memory 29A (corresponding to an LM in the drawing), and an external interface 30A (corresponding to an external I/F in the drawing). In the present embodiment, these processors 281 to 284 may sometimes be called by their names MPPK0 (MP0) to MPPK3 (MP3). These processors 281 to 284, the local memory 29A, and the external interface 30A are connected to each other via wiring (not shown). Incidentally, since the processors 281 to 284 have almost the same configuration, the following explanation will be mainly focused on the processor 281.

The local memory 29A has, for example, five areas that are a first area 291 (corresponding to an area for MP0 in the drawing), a second area 292 (corresponding to an area for MP1 in the drawing), a third area 293 (corresponding to an area for MP2 in the drawing), and a fourth area 294 (corresponding to an area for MP4 in the drawing), and a package memory area 295. The package memory area 295 is a common area that can be accessed by each processor 281 to 284 and stores control information described later. This control information is also stored in the shared memory 25 as described later. Part of these pieces of control information may be different from each other depending on timing of updates.

The first area 291 is a storage area used by the processor 281; the second area 292 is a storage area used by the processor 282; the third area 293 is a storage area used by the processor 283; and the fourth area 294 is a storage area used by the processor 284.

The above-described first area 291 stores an ownership control program 291A, a various ownership assignment program 291B, a configuration control program 291C, an LDEV control program 291D, a cache control program 291E, an external connection control program 291F, an LR (local router) control program 291G, a journal creation program 291H, a failure processing program 291I, and an operating ratio calculation program 291J.

The processor 281 loads a necessary program from the above-mentioned programs such as the ownership control program 291A onto, for example, the first area 291 in the local memory 29A and executes the loaded program.

The ownership control program 291A controls the above-described assignment of ownership and cancellation thereof. The details of the ownership control program 291A will be explained with respect to an ownership control method described later. The various ownership assignment program 291B, which will be described later in detail, has a function assigning the various types of ownership to resources. The configuration control program 291C controls the device configuration based on configuration information (not shown). This configuration information is updated by a service processor (not shown) (hereinafter sometimes referred to as SVP). The LDEV control program 291D controls writing/ reading of data to and from a volume corresponding to the above-mentioned LDEV. The cache control program 291E controls writing/reading of data to and from the cache memory 27.

If the disk unit 11 is added as shown with a dashed line, the external connection control program 291F controls connection with this added disk unit 11. The LR (local router) control program 291G, which will be described later in detail, controls a local router for the channel adapter 21 and thereby controls data transfer to and from the host computer 3. The details of this local router will be explained later. If data of a certain volume is updated, the journal creation program 291H creates a journal about the update content and stores the journal data in a journal volume described later. Incidentally, a volume is sometimes expressed as an LDEV in the present embodiment. If a failure occurs in at least any one of the processors 281 to 284 included in the processor package 24A, the failure processing program 291I executes specified processing. The operating ratio calculation program 291J calculates an operating ratio of the processor package 24A or per processor unit, which is a component of the processor package 24A, at regular intervals and updates processor operation information described later.

(2-2) Channel Adapter (CHA)
(2-2-1) Configuration of Channel Adapter

Figures 3, 4:
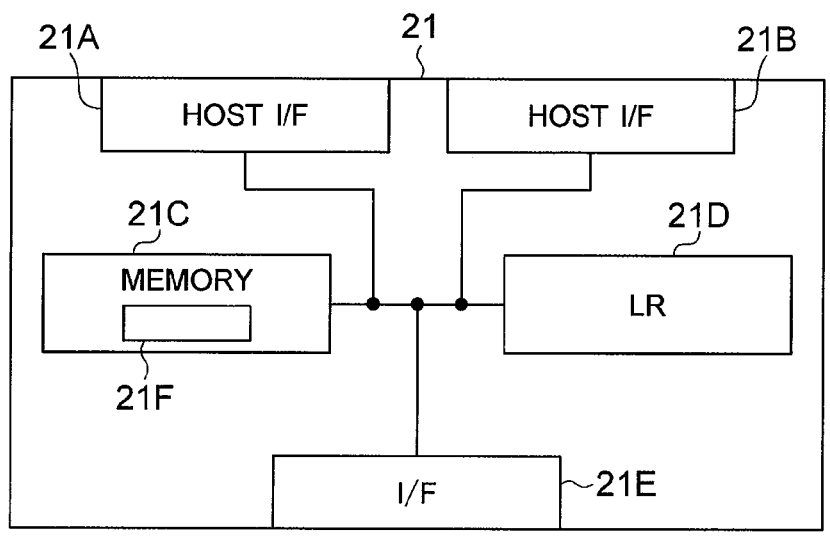
FIG. 3 is a block diagram showing a schematic configuration example for a channel adapter.
FIG. 4 shows a configuration example for a transfer destination search table.

FIG. 3 shows a schematic configuration example for the channel adapter 21. The channel adapter 21 includes host interfaces (corresponding to I/Fs in the drawing) 21A, 21B, a memory 21C, a local router (corresponding to LR in the drawing) 21D, and an interface (corresponding to I/F in the drawing) 21E. On a side note, a switch package for connecting the above-listed components is omitted in the example shown in FIG. 3.

The host interface (I/F) 21A is an interface with an external device such as the host computer 3. Incidentally, since the host interface 21B has almost the same configuration as that of the host interface 21A, a description of the host interface 21B has been omitted. The host interface 21A transfers a command, which has been received from the host computer 3, to any processor package to be processed from the processor packages such as 24A, 24B. The memory 21C provides a storage area used by the local router 21D. This memory 21C stores a transfer destination search table 21F.

The transfer destination search table 21F manages an LDEV number and a processor package number for processor packages having ownership. Incidentally, a processor package may be sometimes expressed as an MPPK in the present embodiment. The local router 21D controls the entire channel adapter 21 in accordance with a command received from the host interface 21A. The local router 21D analyzes the command; and if the command contains the LDEV number, the local router 21D recognizes the command as the operation for a volume (LDEV) corresponding to that LDEV number and identifies a processor package having ownership. Specifically speaking, the local router 21D searches the transfer destination search table 21F described later, using that LDEV number as a search key, and then identifies the processor package 24A having ownership to the volume corresponding to that LDEV number. The interface (corresponding to an I/F in the drawing) 21E is an interface with the switch 20.

(2-2-2) Transfer Destination Search Table

FIG. 4 shows a configuration example for the transfer destination search table 21F. The transfer destination search table 21F manages the LDEV number and the processor package number. The LDEV number is a number used to identify each volume as mentioned above. The processor package number is a number used to distinguish each processor package in, for example, a plurality of processors package 24A and 24B. In the present embodiment, for example, the processor package number of the processor package 24A is 0, the processor package number of the processor package 24B is 1, and the processor package number of a processor package not shown is 2.

(2-3) Shared Memory

Figure 5:
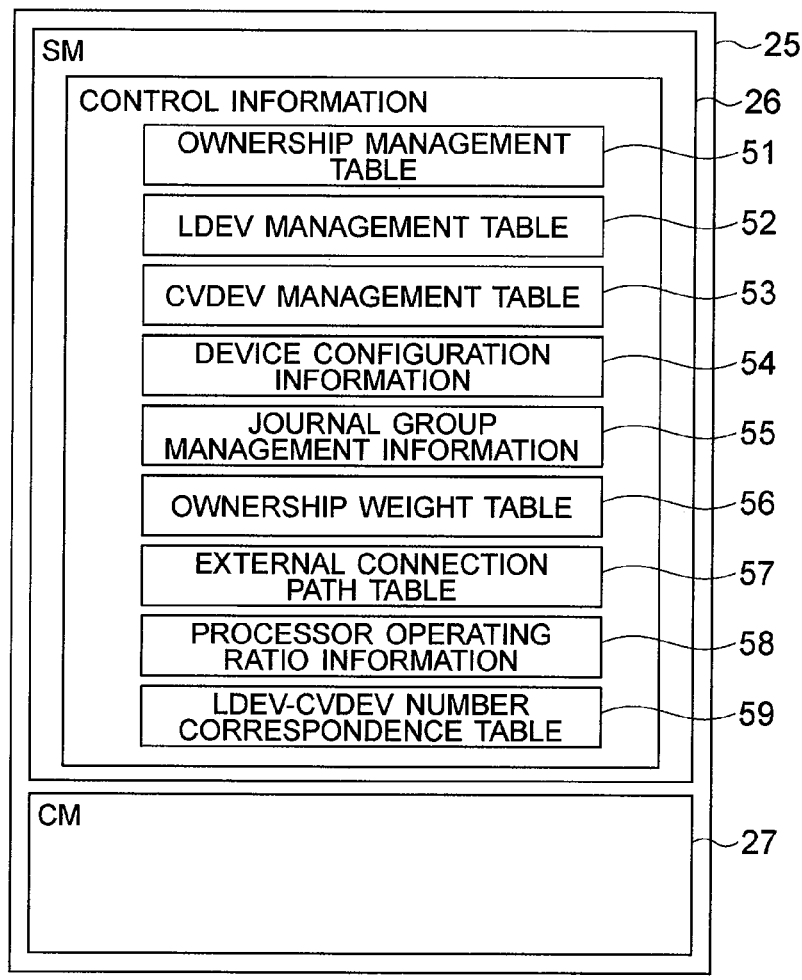
FIG. 5 shows an example of control information stored in a shared memory.

FIG. 5 shows an example of control information stored in the shared memory 26. The control information includes tables and information described below. This shared memory 26 is accessed by each of the plurality of processors package 24A as the need arises, and stored data is read from, or data is written to, the shared memory 26.

This shared memory 26 stores as the control information, an ownership management table 51, an LDEV management table 52, a CVDEV (Cache VDEV) management table 53, a device configuration information table 54, journal group management information 55, an ownership weight table 56, an external connection path table 57, processor operating ratio information 58, and an LDEV-CVDEV number correspondence table 59. On a side note, the present embodiment will be described assuming that the shared memory 26 stores all these pieces of control information; however, the control information stored in the shared memory 26 is not limited to this example, and a combination of some pieces of control information may be stored in the shared memory 26. Also, a journal group may sometimes expressed as a JNLG in the following explanation.

The ownership management table 51 is a table for managing a plurality of types of ownership regarding whether a plurality of types of resources including the aforementioned volumes can be accessed or not. The device configuration information table 54 is a table for managing information indicating the device configuration about the disk controller 12 and the disk unit 11.

The LDEV management table 52 is a table for managing a first volume as a storage area composed of at least one hard disk drive 11A. The CVDEV management table 53 is a table for managing a second volume as at least one storage area in the aforementioned cache memory 27. The journal group management information 55 is information for managing journal groups.

The ownership weight table 56 is a table for managing weight used when assigning the ownership to the processor package 24A with respect to each resource.

The external connection path table 57 manages a connection path for the added disk unit 11. The processor operating ratio information 58 is information about an operating ratio of each processor (such as 281) included in the processor packages (such as 24A). The LDEV-CVDEV number correspondence table 59 is a table for associating LDEVs with CVDEVs described later. When a volume (LDEV) is created in the present embodiment, identification information for a CVDEV (hereinafter referred to as the CVDEV number) corresponding to this LDEV is decided and registered in this LDEV-CVDEV number correspondence table 59.

(2-4) VDEV

Figure 6:
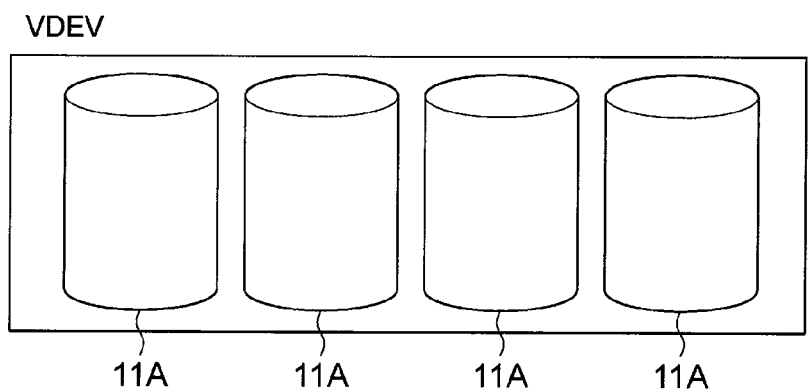
FIG. 6 shows a configuration example for a VDEV.

FIG. 6 shows a configuration example for a VDEV. The VDEV is a unit by which a plurality of hard disk drives 11A which constitute a RAID parity group are put together and treated as one volume. The example of FIG. 6 shows that, for example, four hard disk drives 11A are treated as one VDEV.

(2-5) Corresponding Relationship Between VDEV, CVDEVs, and LDEVs

Figure 7:
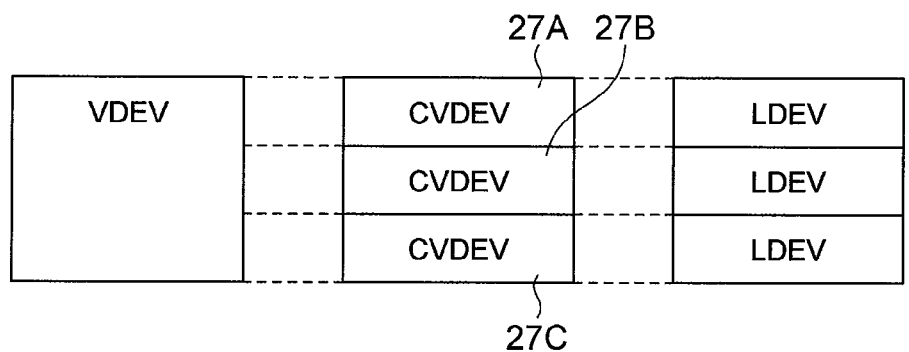
FIG. 7 shows the corresponding relationship between a VDEV, CVDEVs, and LDEVs.

FIG. 7 shows the corresponding relationship between a VDEV, CVDEVs, and LDEVs according to the present embodiment. The LDEV is a unit obtained by logically dividing a VDEV and such divided units are to be used as separate devices. The CVDEV is a volume for managing a cache slot (hereinafter referred to as the slot). The CVDEV is used when dealing with this slot.

The CVDEVs are introduced in the present embodiment because of the background described below. Firstly, if cache management is performed on a VDEV basis, when the ownership of a VDEV is to be transferred, all the HDEVs under that VDEL become transfer targets. In this case, HDEVs which should not be transferred may become the transfer targets, so that CVDEVs having the following relationship with the HDEVs are introduced: HDEV:CVDEV=1:1 or 1:n. In the present embodiment, the above-described problem is solved by transferring the ownership on a CVDEV basis as described later.

(2-6) Disk Adapter (DKA)

Figure 8:
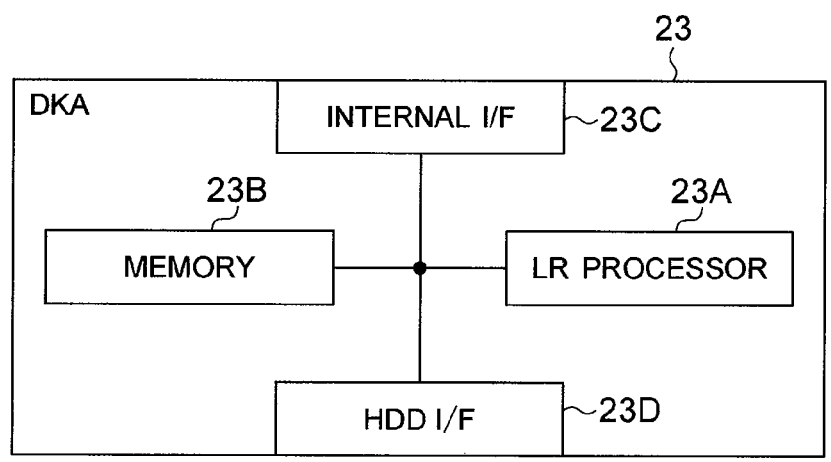
FIG. 8 shows a configuration example for a disk adapter.

FIG. 8 shows a configuration example for the disk adapter 23. The disk adapter 23 is configured so that a local router (LR) processor 23A, a memory 23B, an internal interface 23C, and a hard disk drive (HDD) interface (I/F) 23D are packaged.

The LR processor 23A controls the entire disk adapter 23. The memory 23B has a storage area used by the LR processor 23A. The internal interface 23C is an interface connected to the aforementioned switch 20. The hard disk drive (HDD) interface 23D is configured by adopting so-called disk enclosure.

(3) Ownership (3-1) Outline

In the present embodiment, for example, LDEV ownership, CVDEV ownership, external volume ownership, journal group ownership (JNLG ownership), and port ownership exist as a plurality of types of ownership. On a side note, the present embodiment may be applied to a combination of some of the above-listed types of ownership or a combination of some of the above-listed types of ownership and ownership of other resources.

The LDEV ownership is an authority to access LDEV control information (LDCB) as information for controlling LDEVs. This LDEV control information includes various types of control information relating to LDEVs such as information for I/O, information for exclusive use in terms of systems. The processor package 24A hits data in the package memory area 295 in the local memory 29A, instead of the shared memory 25, with regard to high-access-frequency information according to cache control. This package memory area 295 stores control information as the above-mentioned high-access-frequency information. Each processor package 24B to 24D mentioned earlier stores the same control information in its package memory area 295 in the local memory 29A unless the control information is updated.

For example, if the same corresponding control information in another processor package 24B is updated, the same control information in another processor package 24C becomes the previous information. Therefore, Cache discard control is performed on that package memory area 295. Since the cache discard overhead for the cache control is very large, it is desirable that the cache discard frequency should be as low as possible. Consequently, regarding writing data to the LDEV control information, only access to a processor package having the LDEV ownership is permitted in the present embodiment.

The CVDEV ownership is ownership used to decide a processing package should be assigned an exclusive right to access a VDEV managed by the cache memory 27, that is, CVDEV.

The external volume ownership is ownership used to decide the processor package 24A, to which an exclusive right to access control information for an external volume provided by, for example, the added disk unit 11 is to be assigned, in order to use an exclusive cache for the shared memory 25 to manage the above-described control information.

The journal group ownership is ownership used to decide a processor package having an exclusive right to access control information for journal groups handled by a remote copy program in order to perform exclusive cache control of the shared memory 25 when managing the above-described control information.

The port ownership is ownership used to decide a processor package to which a command issued by the host computer 3 without specifying the LDEV number is issued (hereinafter referred to as the LDEV-non-dependent command), and to which an error in the channel adapter 21 is reported. Incidentally, a command which is issued by the host computer 3 and in which the LDEV number is specified is called the LDEV-dependent command in the present embodiment. Since the port number is assigned by distinguishing between the channel adapter 21 and the disk adapter 23, the port ownership is classified into front-end port ownership and back-end port ownership for the management purpose.

(3-2) Cooperative Transfer of Ownership (LDEV, CVDEV, and JNLG Ownership)

The journal group ownership is ownership when the storage system 1 adopts a remote copy system using a remote copy program.

Figure 9:
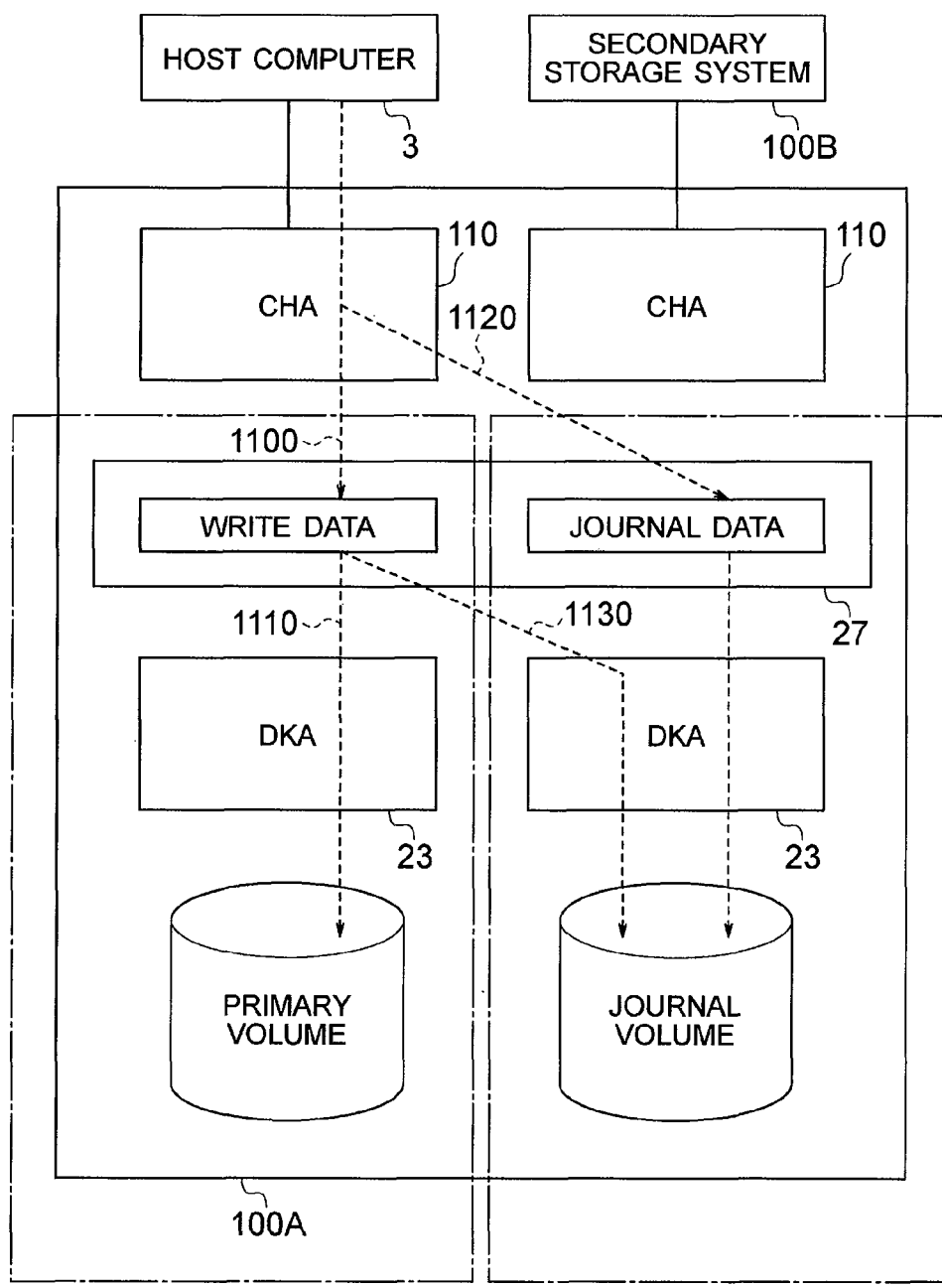
FIG. 9 shows how to create journal data.

FIG. 9 shows how to create journal data. In this example, a primary storage system 100A retains replication target data and a secondary storage system 100B retains data (replicated data) obtained by replicating the replication target data by using the remote copy program. The example in FIG. 9 shows the operation performed when the primary storage system 100A receives a command from the host computer 3 to write data to a primary volume (PVOL). The secondary storage system 1008 has a secondary volume (SVOL). In the primary storage system 100A, the primary volume and a journal volume belong to a journal group; and in the secondary storage system 100B, the secondary volume and a journal volume belong to a journal group. The primary volume and the secondary volume form a pair by means of the remote copy program.

When the channel adapter 21 for the storage system 100A receives a write command from the host computer 3, it secures a slot in the cache memory 27. The host computer 3 sends the write data to the primary storage system 100A and the channel adapter 21 receives the write data and stores it in the cache memory 27.

The channel adapter 21 executes journal creation processing described later, gives a command to the disk adapter 23 to write the write data to the relevant volume, and gives a termination report to the host computer 3. The disk adapter 23 stores the write data in the volume.

In the journal creation processing, the channel adapter 21 creates a journal and stores the journal data in the cache memory 27. The channel adapter 21 gives a command to the disk adapter 23 to write the journal data in the cache memory 27 to the journal volume.

In the present embodiment as described above, there are a mode in which the LDEV ownership and the CVDEV ownership are to be incorporaively transferred (as indicated with a dashed-dotted line on the left side of the drawing) and a mode in which the LDEV ownership and the journal group ownership are to be incorporatively transferred (as indicated with a dashed-dotted line on the right side of the drawing).

(3-3) Cooperative Transfer of Port Ownership

Figure 10:
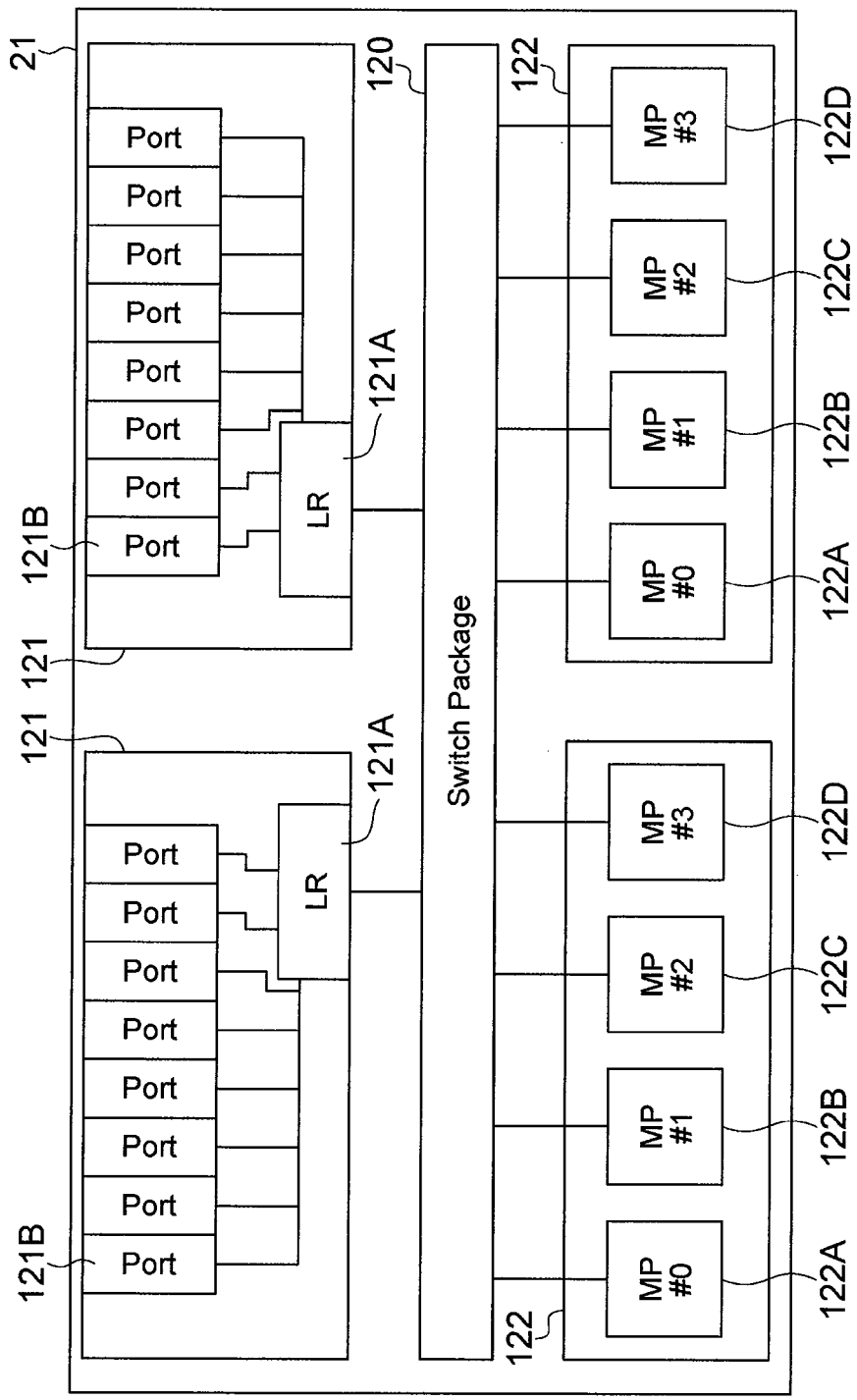
FIG. 10 shows a detailed configuration example for a channel adapter.

FIG. 10 shows a detailed configuration example for the channel adapter 21. The channel adapter 21 includes a switch package 120, two port packages 121 as front-end and back end ports and two channel processor package 24.

The switch package 120 is connected to the port packages 121 and the channel processor packages 24. The port packages 121 control data transfer to and from the host computer 3 via ports, to which the host computer 3 is connected, under the control of the channel processor packages 24. Each port package 121 includes a local router 121A and eight ports 121B. The local router 121A is connected to the switch package 120. The eight ports 121B are connected to the local router 121A.

Each channel processor package 24 has four processor packages 24A to 24D. These processor packages 24A to 24D control the port packages 121 via the switch package 120.

In the present embodiment, for example, a certain processor package 24A incorporatively transfers the port ownership relating to the 8 ports 121B, which are included in the port 121, to another processor package 24B.

(3-4) External Volume Ownership

Figure 11:
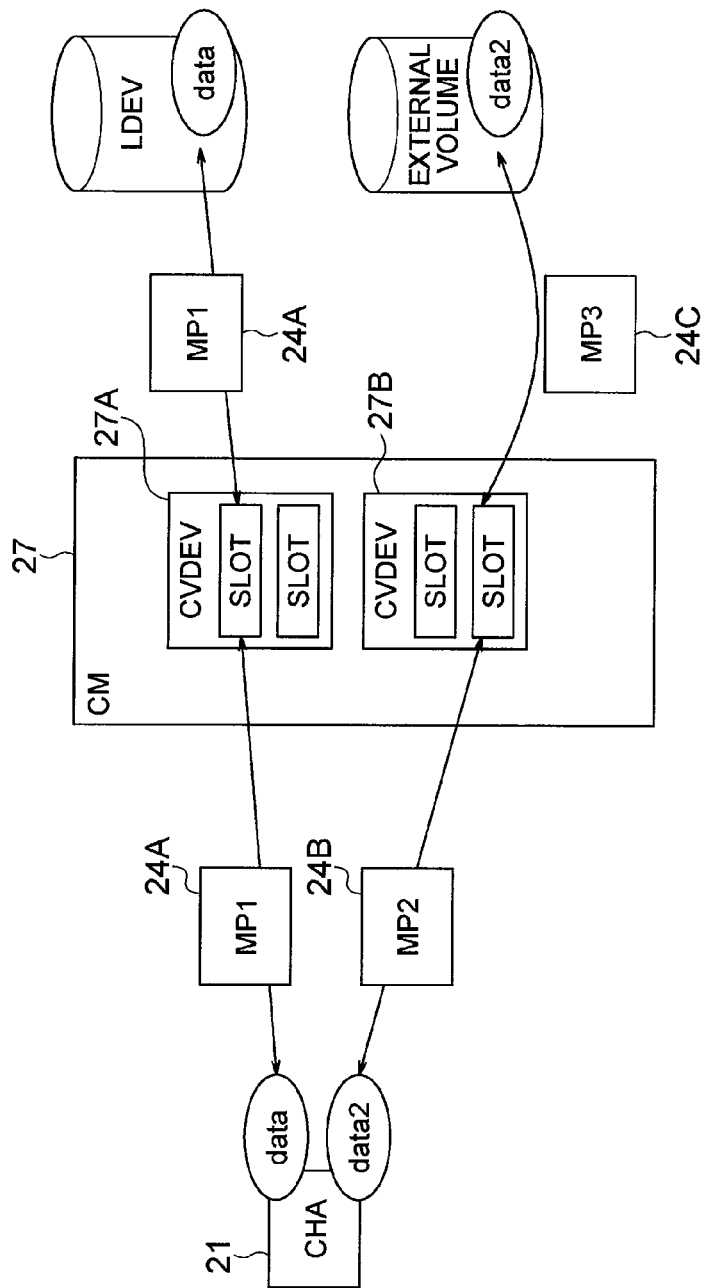
FIG. 11 shows an example of processing executed by a processor package having external volume ownership.

FIG. 11 shows an example of processing executed by the processor packages (such as 24A) having the external volume ownership. In the following explanation, the processor package 24A has the CVDEV ownership of a CVDEV 27A and the LDEV ownership of a volume (LDEV). Moreover, the processor package 24B has the CDVED ownership of a CVDEV 27B and the processor package 24C has the external volume ownership of an external volume which is the added disk unit 11.

The processor package 24A transfers data between the channel adapter 21 and a slot in the CVDEV 27A and also transfers data between the volume (LDEV) and the slot in the CVDEV 27A. The processor package 24B transfers data between the channel adapter 21 and a slot in the CVDEV 27B. The processor package 24C transfers data between the channel adapter 21 and a slot in the CVDEV 27B.

(3-5) Content of Ownership Management Table (3-5-1) Entity Information

FIG. 12 shows an example of entity information in the ownership management table 51. In the present embodiment, the content of the ownership management table 51 is called the entity information. This entity information includes the processor package number corresponding to the LDEV number. This entity information represents a processor package to be associated with a volume (LDEV) corresponding to the LDEV number. Specifically speaking, the entity information shows that the processor package with this processor package number has the LDEV ownership of the volume with the corresponding LDEV number. Incidentally, it is possible to assign each piece of ownership to each processor. In this case, the entity information of the ownership management table 51 is configured so that the corresponding LDEV number can be assigned to each processor for the processor package.

(3-5-2) Reference Information

FIG. 13 shows an example of reference information of the ownership management table 51. The reference information of the ownership management table is the same content as the entity information unless the entity information is updated; however, part of the reference information may be different from the entity information depending on update timing.

Incidentally, the reference information of the ownership management table 51 shown in FIG. 13 may be configured so that the corresponding LDEV number can be assigned to each processor for the processor package.

(4) Ownership Control Method (4-1) Ownership Retainment Method

Figure 14:
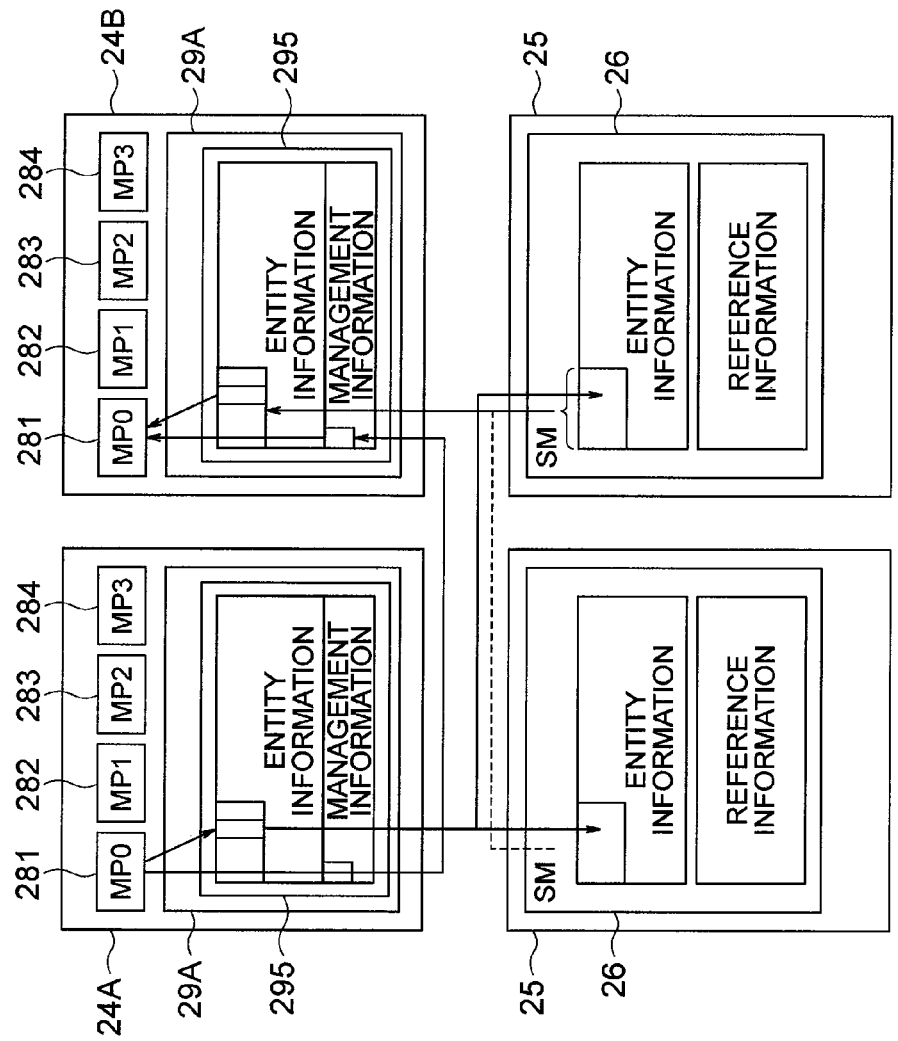
FIG. 14 shows an example of an ownership retaining method.

FIG. 14 shows an example of an ownership retainment method. The example in FIG. 14 shows processing executed between the processor package 24A and the shared memory 25 using the entity information and management information. The management information is information for managing, for example, the update history of the entity information.

The entity information is doubly retained in the package memory area 295 in each processor package 24A and in the shared memory 25. When updating the ownership entity information in the processor package 24A, for example, the processor 281 updates both the entity information in the package memory area 295 in the local memory 29A and the entity information in the shared memory 25 and also updates the management information in the package memory area 295 in the local memory 29A for another processor package 24B. As a result, it is possible to objectively determine inconsistency between the entity information in the package memory area 295 and the entity information in the shared memory 25.

When referring to this entity information, the processor 281 refers to the management information in the package memory area 295 in the local memory 29A. The processor 281 checks whether the management information in the package memory area 295 in the local memory 29A is identical to the management information in the shared memory 25 or not. If these pieces of management information are identical to each other, the processor 281 refers to the package memory area 295 in the local memory 29A; and if these pieces of management information are not identical to each other, the processor 281 fetches the entity information from the shared memory 25, stores it in the package memory area 295, and refers to it. The reference information is retained only in the shared memory 25 and the processor 281 updates and refers to the reference information in the shared memory 25. Both the entity information and the reference information are provided to the SVP (not shown) as the need arises, and are managed as part of configuration information files.

Incidentally, in the present embodiment, the entity information and the reference information may be saved in a flash memory (not shown) for each processor when the power is turned off. As a result, even if the information in the shared memory 25 is lost when the power is turned on, the information can be restored from the entity information and reference information existing in the flash memory. Furthermore, if the entity information and the reference information are set as targets of a power-on state backup function, the information can be restored from backup information in the SVP even if restoration from an SSD in the cache memory 27 fails when the power is turned on after power shutdown. On an aside, when a device is turned off in accordance with a normal procedure, the device information is withdrawn to a flush memory of each processor package of the device. The above-mentioned power-on state backup function is a preliminary backup of the device information whereby the device stores information in SVP in addition to the withdrawn information on the flush memory.

(5) Ownership Assignment

(5-1) Outline of Ownership Assignment

Figure 15:
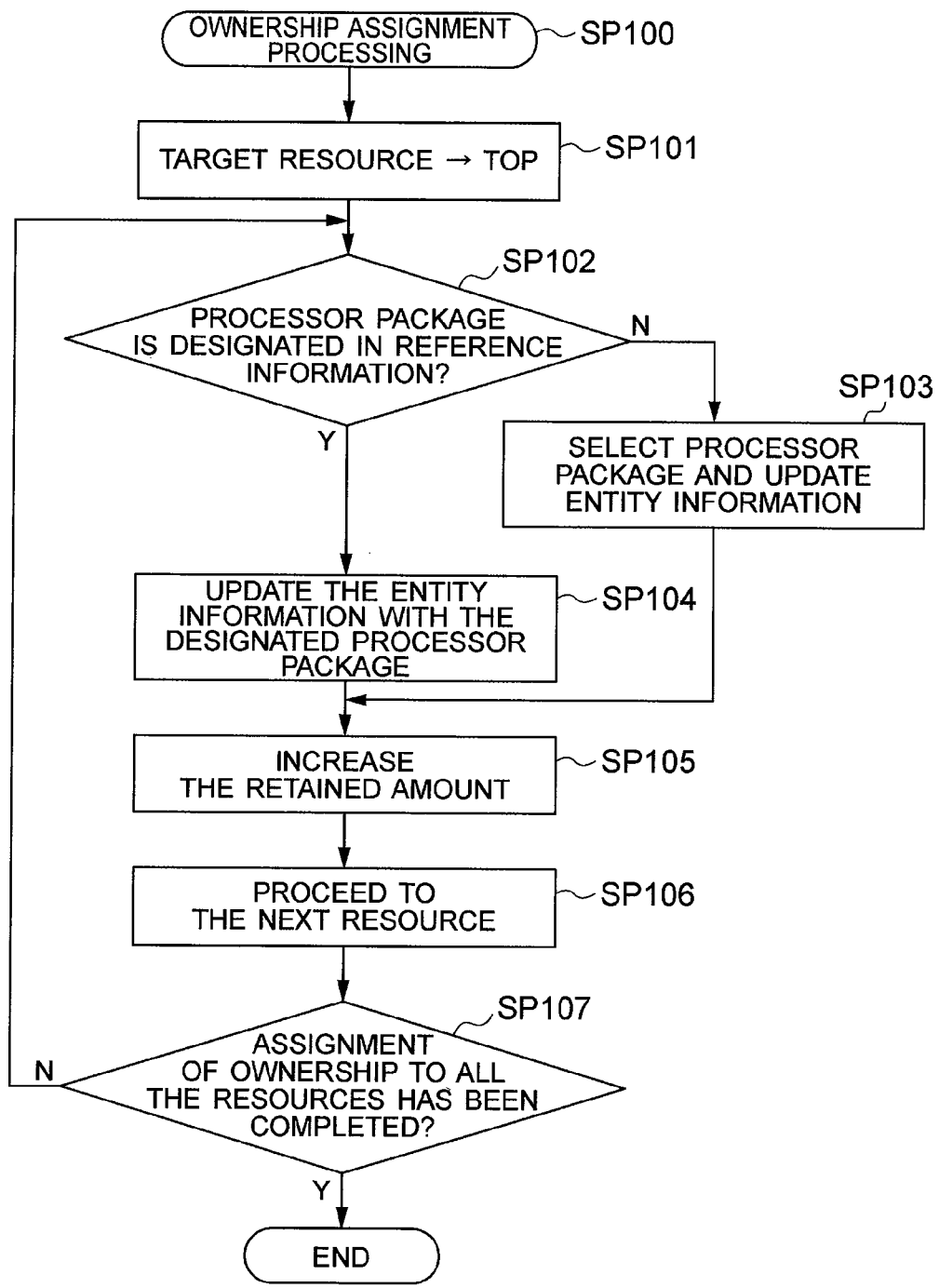
FIG. 15 shows a flowchart illustrating an example of ownership assignment processing.

FIG. 15 shows an example of ownership assignment processing. In the present embodiment, there are three types of resources to which ownership needs to be assigned as triggered by initial setting, as follows: LDEVs, CVDEVs, and ports (front-end/back-end). From these resources, the LDEVs can be assigned the ownership as designated by the SVP (not show); and if the SVP does not designate the assignment of ownership, the processor 281 automatically assigns the ownership to the LDEVs. Regarding the CVDEVs and the ports, the processor 281 automatically assigns the ownership to them.

The storage system 1 according to the present embodiment is equipped with the SVP for setting the ownership relating to an LDEV corresponding to a first volume at the time of, for example, initial setting. The processor 281 for the processor package 24A automatically sets ownership of a CVDEV and port as a second volume in accordance with the ownership relating to the LDEV.

The processor 281 for the processor package 24A sets a target resource to the top from the plurality of resources as mentioned above (SP101). The processor 281 judges whether or not a processor package that can be designated based on the LDEV number exists in the reference information about the target resource (SP102).

If no processor package (or processor) which can be designated exists, the processor 281, the processor 281 selects a processor package having the smallest retained amount from processor packages which belongs to the same module as that of the target resource and whose inhibition information is PERMITTED; and then updates the entity information in the local memory 29A according to the selection of the processor package (SP103). The retained amount in the present embodiment means the number of pieces of ownership retained by the relevant processor package (or processor). Incidentally, the transfer destination of the ownership in the present embodiment may be a processor in a certain processor package or another processor including another processor package, or a processor package equipped with at least one processor. A processor package will be mainly used as an example of the transfer destination in the following explanation.

On the other hand, if a processor package is designated, the processor 281 updates the entity information with the processor package designated from the plurality of processors package 24A to 24D (SP104).

The processor 281 increases the retained amount according to the update content and then update the retained amount information (SP105). Next, the processor 281 proceeds to the next resource target (SP106). The processor 281 judges whether assignment of the ownership to all the resources has been completed or not. If the assignment has not been completed, the processor 281 returns to step SP102 and executes the processing; and if the assignment has been completed, the processor 281 terminates this ownership assignment processing.

(5-2) LDEV Ownership Assignment

Figure 16:
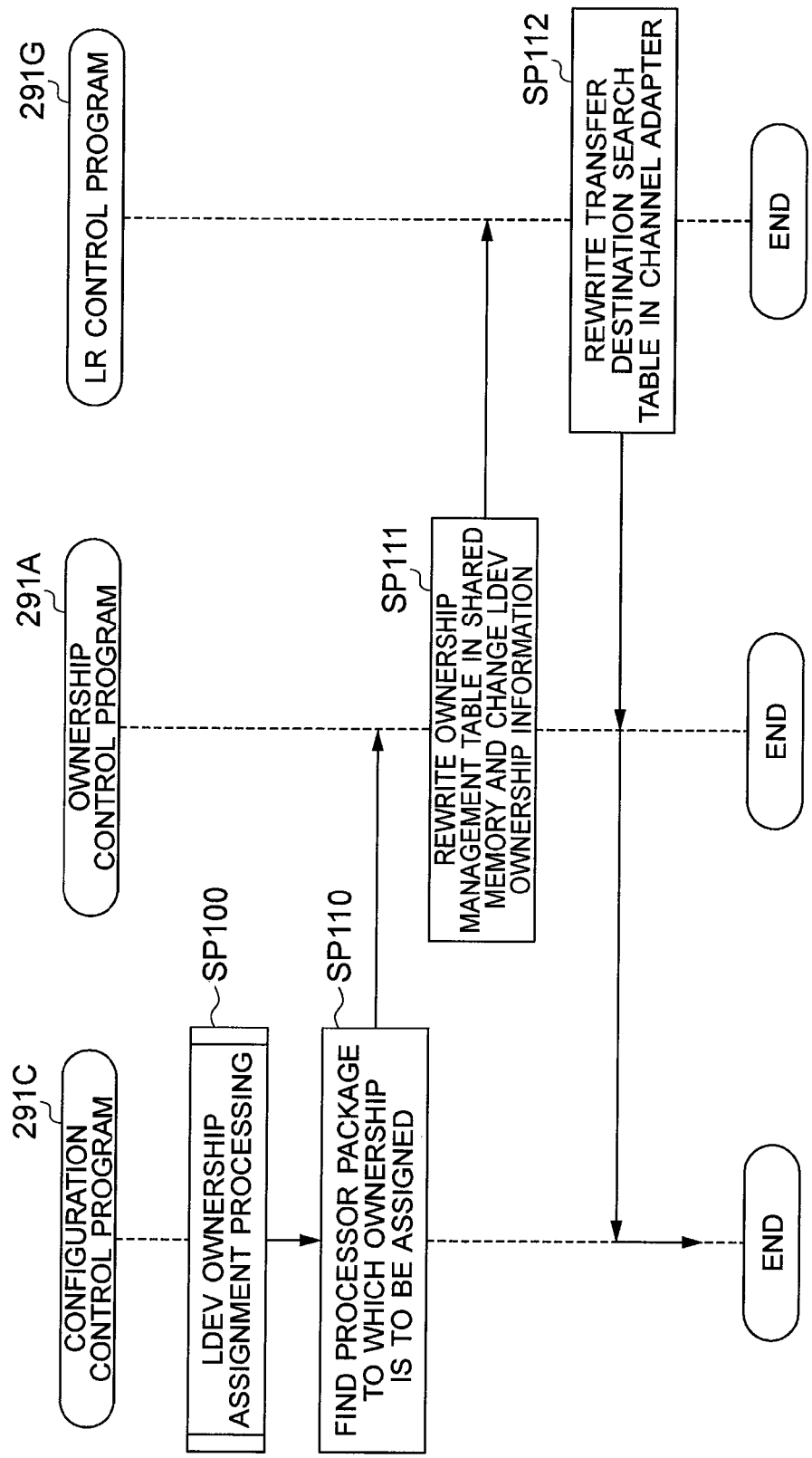
FIG. 16 is a sequence chart showing an operation example for each program in assigning LDEV ownership.

FIG. 16 shows an operation sequence of each program for assigning the LDEV ownership. As triggered by reception of, for example, an ownership assignment command relating to an LDEV from the SVP (not shown), the processor 281 executes the configuration control program 291C. This configuration control program 291C starts the above-described ownership assignment processing (SP100). The configuration control program 291C finds a processor package to which the LDEV ownership is to be assigned (SP110), and notifies the ownership control program 291A to that effect.

The ownership control program 291A rewrites the ownership management table 51(*first* ownership management table) stored in the shared memory 25, changes the entity information about the ownership relating to the designated LDEV (LDEV ownership), and notifies the LR control program 291G to that effect (SP111). The LR control program 291G rewrites the transfer destination search table 21F in the channel adapter 21 (SP112).

(5-3) CVDEV Ownership Assignment

Figure 17:
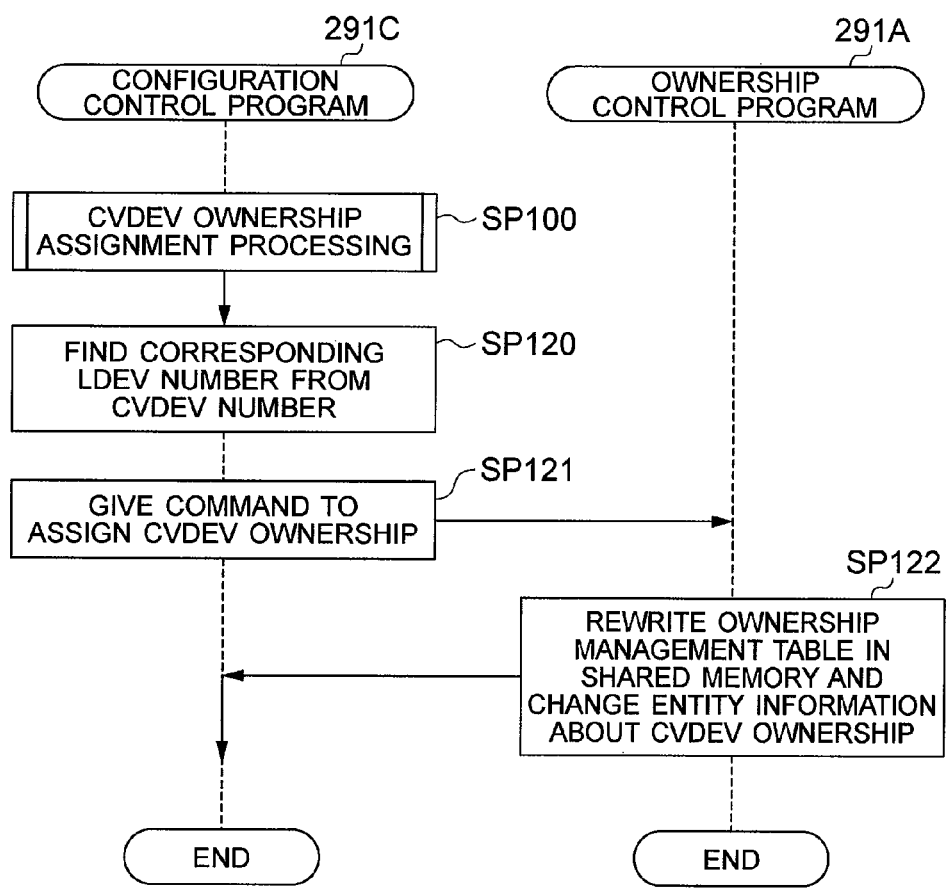
FIG. 17 is a sequence chart showing an operation example for each program in assigning CVDEV ownership.

FIG. 17 shows an operation sequence of each program for assigning the CVDEV ownership. As triggered by the reception of, for example, an ownership assignment command relating to a CVDEV from the SVP (not shown), the processor 281 executes the configuration control program 291C. This configuration control program 291C executes the above-described ownership assignment processing (SP100).

The configuration control program 291C finds the LDEV number from the CVDEV number which is a target resource (SP120). The configuration control program 291C refers to the LDEV-CVDEV number correspondence table 59 stored in the shared memory 25. Next, the configuration control program 291C gives a command to the ownership control program 291A to assign the CVDEV ownership (SP121).

The ownership control program 291A rewrites the ownership management table 51 stored in the shared memory 25 and changes the entity information about the CVDEV ownership (SP122).

(5-4) External Volume Ownership Assignment

Figure 18:
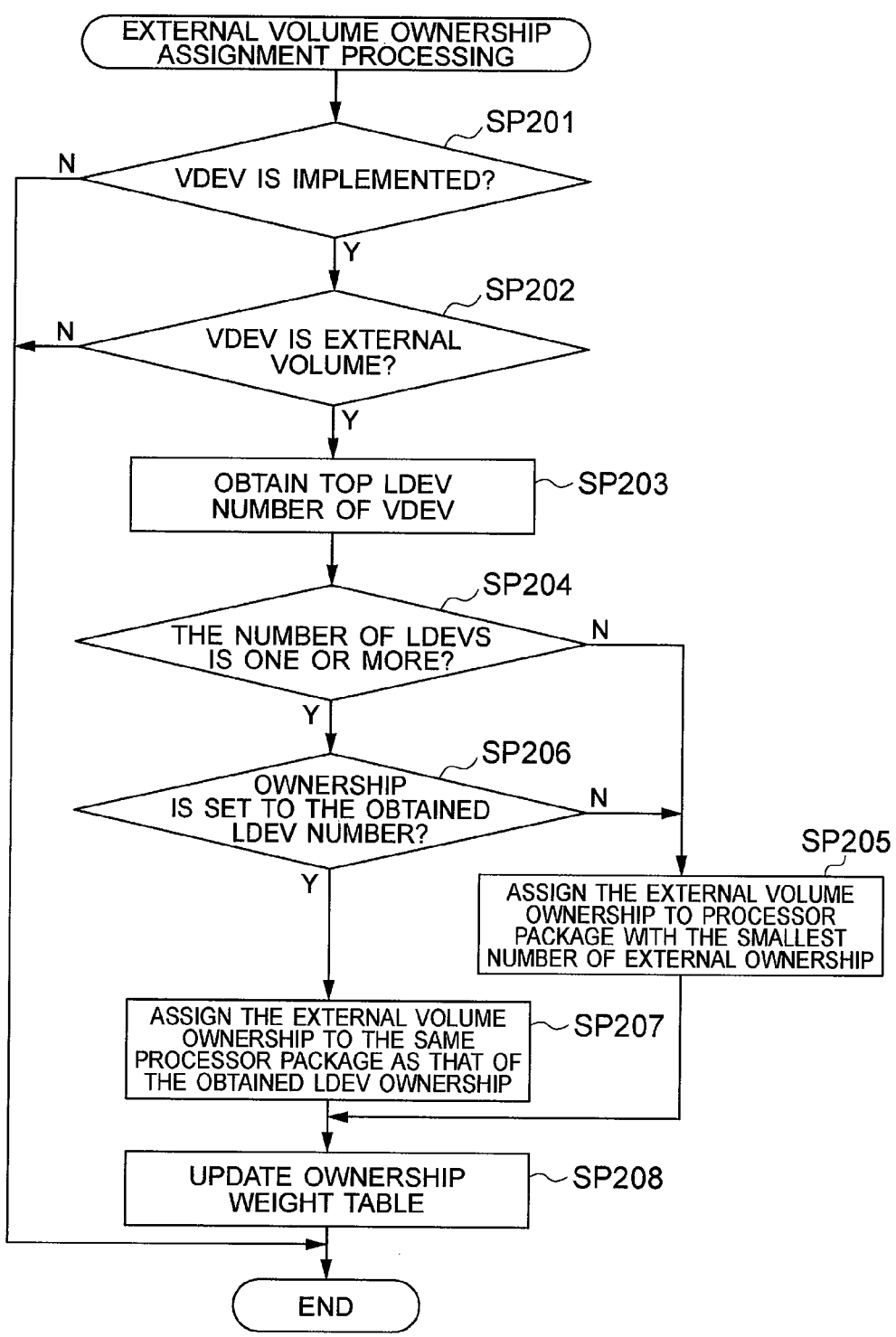
FIG. 18 is a flowchart illustrating an example of an external volume ownership assignment processing sequence.

FIG. 18 shows an example of an external volume ownership assignment processing sequence. The processor 281 for the processor package 24A judges whether a VDEV as a target resource is implemented or not (SP201). If the VDEV is implemented, the processor 281 executes the next step SP202; and if the VDEV is not implemented, the processor 281 terminates this processing.

In step SP202, the processor 281 judges based on the configuration information whether the VDEV is an external volume for the added disk unit 11 or not. If this VDEV is not the external volume, the processor 281 terminates this processing; and if the VDEV is the external volume, the processor 281 obtains the top LDEV number of the VDEV (SP203).

Next, the processor 281 checks the number of LDEVs based on the configuration information. If the number of LDEVs is not one or more, the processor 281 assigns the external volume ownership to any of processors for a processor package with the smallest number of assigned external volume ownership (or to the processor package itself) (SP205).

On the other hand, if the number of LDEVs is one or more, the processor package 24A judges whether the ownership is set to the obtained LDEV number or not (SP206). If the ownership is not set to the obtained LDEV number, the processor 281 executes the above-described step SP205; and if the ownership is set to the obtained LDEV number, the processor 281 assigns the external volume ownership to the same processor package having the obtained LDEV ownership (SP207). Subsequently, the processor package 24A updates the ownership weight table 56 (SP208).

(5-5) Journal Group Ownership Assignment

Figure 19:
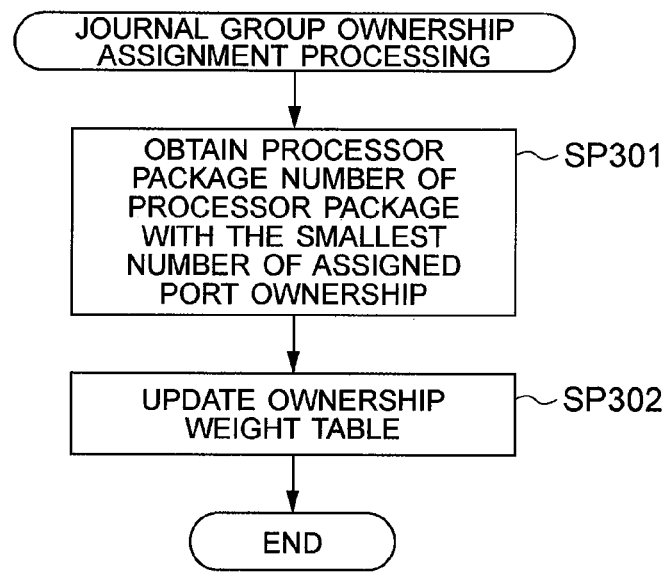
FIG. 19 is a flowchart illustrating an example of a journal group ownership assignment processing sequence.

FIG. 19 shows an example of a journal group ownership assignment processing sequence. The weight judgment is performed in this journal group ownership assignment processing and the journal group ownership is assigned to a processor package with the lightest weight. The processor 281 for the processor package 24A obtains the processor package number of a processor package with the smallest number of assigned port ownership (SP301). This processor 281 incorporativlely transfers different types of ownership, that is, the LDEV ownership and the journal volume ownership which are related to each other, to the processor package with the above-obtained processor package number. Next, the processor 281 updates the ownership weight table 56 according to the above transfer (SP302). Specifically speaking, such transfer changes the retained amount of ownership, so that the processor 281 changes the weight of ownership accordingly.

(5-6) Port Ownership Assignment

Figure 20:
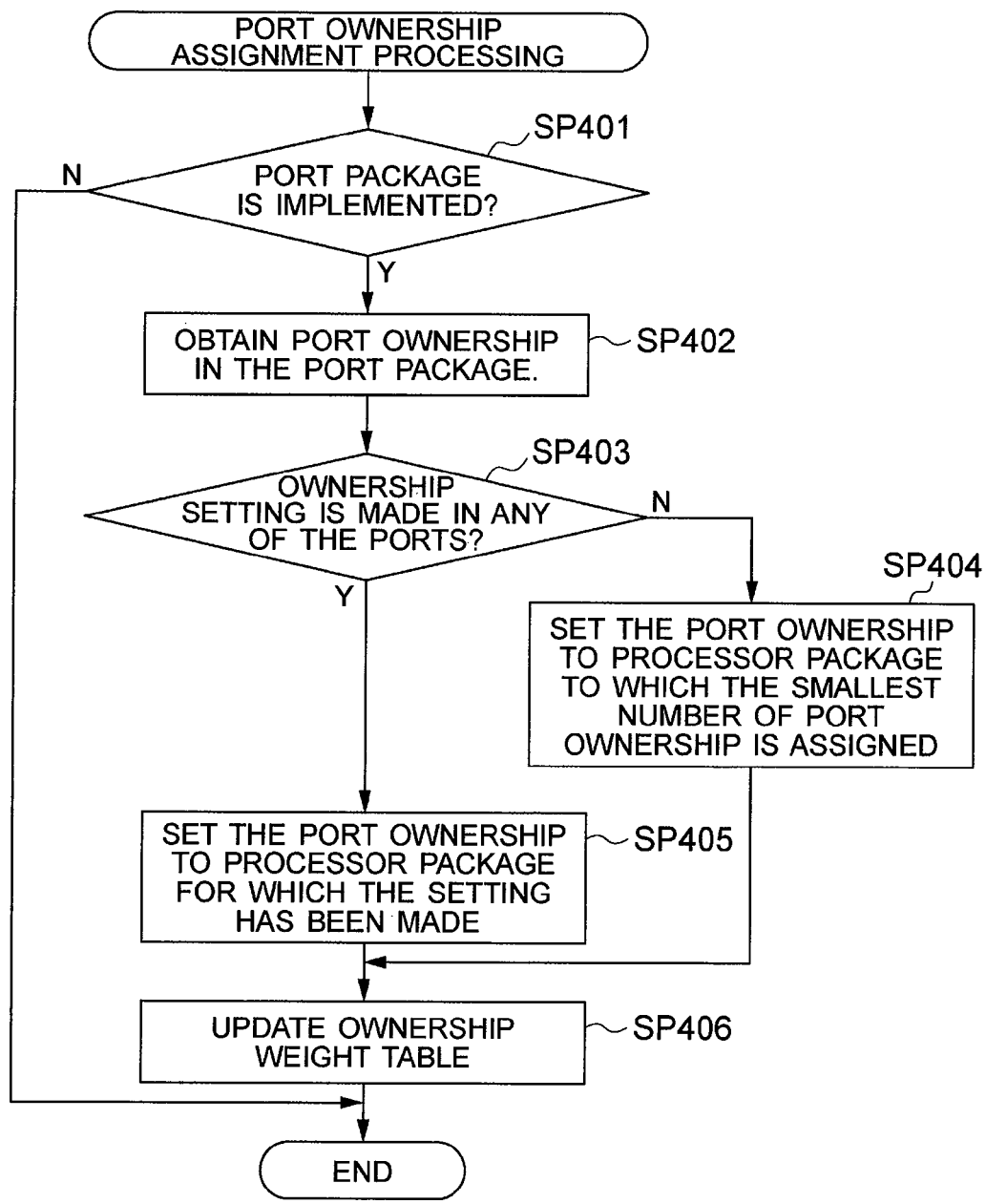
FIG. 20 is a flowchart illustrating an example of a port ownership assignment processing sequence.

FIG. 20 shows an example of a port ownership assignment processing sequence. Firstly, the processor package 24A checks if a specified port package is implemented or not (SP401). If the port package is not implemented, the processor package 24A terminates the processing; and if the port package is implemented, the processor package 24A executes the following step SP402.

In this step SP402, the processor 281 for the processor package 24A obtains the port ownership relating to each port 121B in that port package 121. Next, the processor 281 judges whether or not the port ownership setting is made in any of the ports 121B (SP403). If the port ownership setting is not made in any of the ports 121B, the processor 281 assigns the port ownership to any one of the processor packages 24B to 24D with the smallest number of assigned port ownership (SP404). On the other hand, if the ownership is set to any of the ports 121B and a processor package for which the setting is already made exists, the processor 281 sets the port ownership to that processor package (SP405). The processor 281 updates the ownership weight table 55 based on the above-described setting (SP406).

(6) Read/Write Processing to which Ownership is Applied (6-1) Normal Processing

Figure 21:
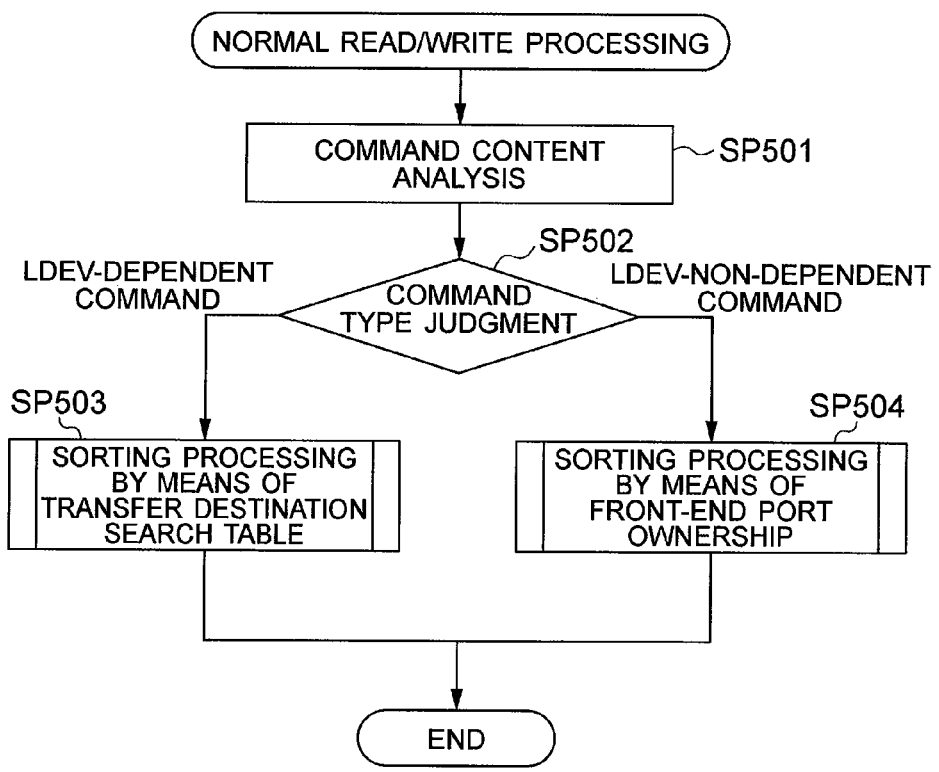
FIG. 21 is a flowchart illustrating an example of a normal read/write processing sequence.

FIG. 21 shows an example of a normal read/write processing sequence. The processor 281 for the processor package 24A analyzes the content of a command received from the host computer 3 (SP501). Next, the processor 281 judges the type of that command (SP502). As for the means of judgment, if that command is the LDEV-dependent command mentioned earlier, the processor 281 determines that it is a command using an LDEV; and if the command does not contain the LDEV number, the processor 281 determines that it is a command not using an LDEV. Incidentally, the LDEV-dependent command as mentioned earlier means a command which contains the LDEV number and relates to the operation of the relevant LDEV; and the LDEV-non-dependent command means a command which does not contain the LDEV number and relates to the operation of a volume other than an LDEV.

If the received command is a command using an LDEV, the processor 281 executes sorting processing by means of the transfer destination search table 21F (SP503). On the other hand, if the received command is a command which does not use an LDEV, the processor 281 executes sorting processing by means of the front-end port ownership (SP504).

(6-2) Operation of Volume (6-2-1) Write Processing

Figure 22:
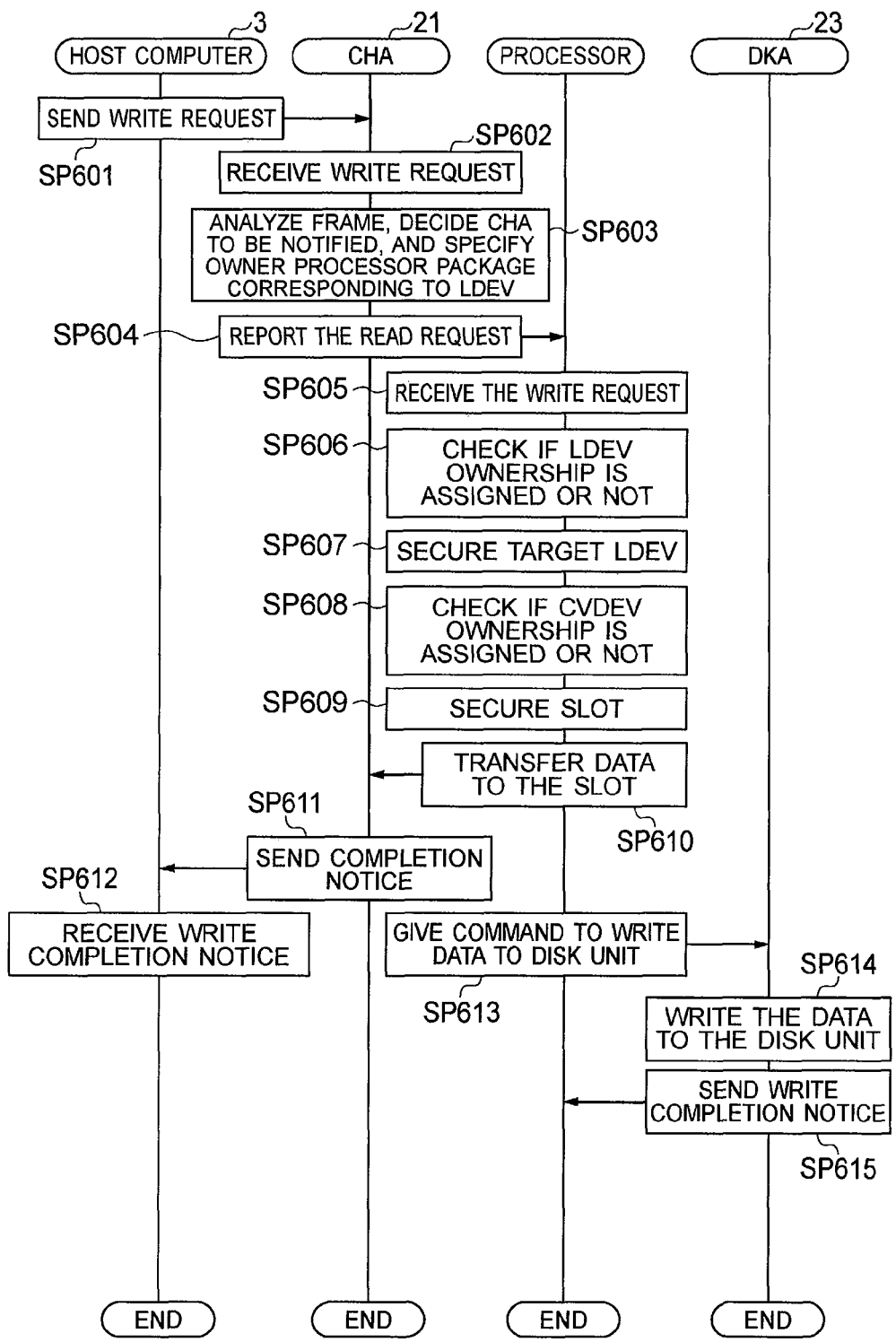
FIG. 22 is a sequence chart showing an example of a processing sequence for writing data to a volume.

FIG. 22 shows an example of a processing sequence for writing data to a volume. The host computer 3 sends a data write request to the channel adapter 21 (corresponding to CHA in the drawing) for the disk controller 12 (SP601). Next, the channel adapter 21 receives that write request (SP602).

The channel adapter 21 analyzes a frame, decides a channel adapter 21 to be notified, refers to the transfer destination search table 21F, and specifies a processor package corresponding to an LDEV for the LDEV number in the LDEV-dependent command (SP603). The specified processor package corresponds to a processor having the LDEV ownership. Subsequently, the channel adapter 21 notifies, for example, the processor package 24A as the specified processor package of the data write request (SP604).

The processor (for example, the processor 281) for the processor package 24A receives the write request (SP605). The processor 281 refers to the ownership management table 51 stored in the local memory 29A and checks if the LDEV ownership relating to the LDEV is assigned or not (SP606). The processor 281 secures the target LDEV (SP607).

Next, the processor 281 refers to the ownership management table 51 and checks if the CVDEV ownership is assigned to itself or not (SP608). Subsequently, the processor 281 secures a slot in the cache memory 27 (SP609). The processor 281 transfers data to the slot in the cache memory 27 (SP610).

The channel adapter 21 sends a data write completion notice to the host computer 3 (SP611). The host computer 3 receives the notice (SP612).

After the processor 281 transfers the data to the slot as described above (SP610), it gives a command to the disk adapter 23 to execute processing for writing the data to the disk unit 11 (SP613).

After receiving the command, the disk adapter 23 executes the processing for writing the data to the disk unit 11 (SP614). After completing the data writing, the disk adapter 23 sends a data write completion notice to the processor 281 (SP615). This processor 281 terminates the processing (SP616).

(6-2-2) Read Processing

Figure 23:
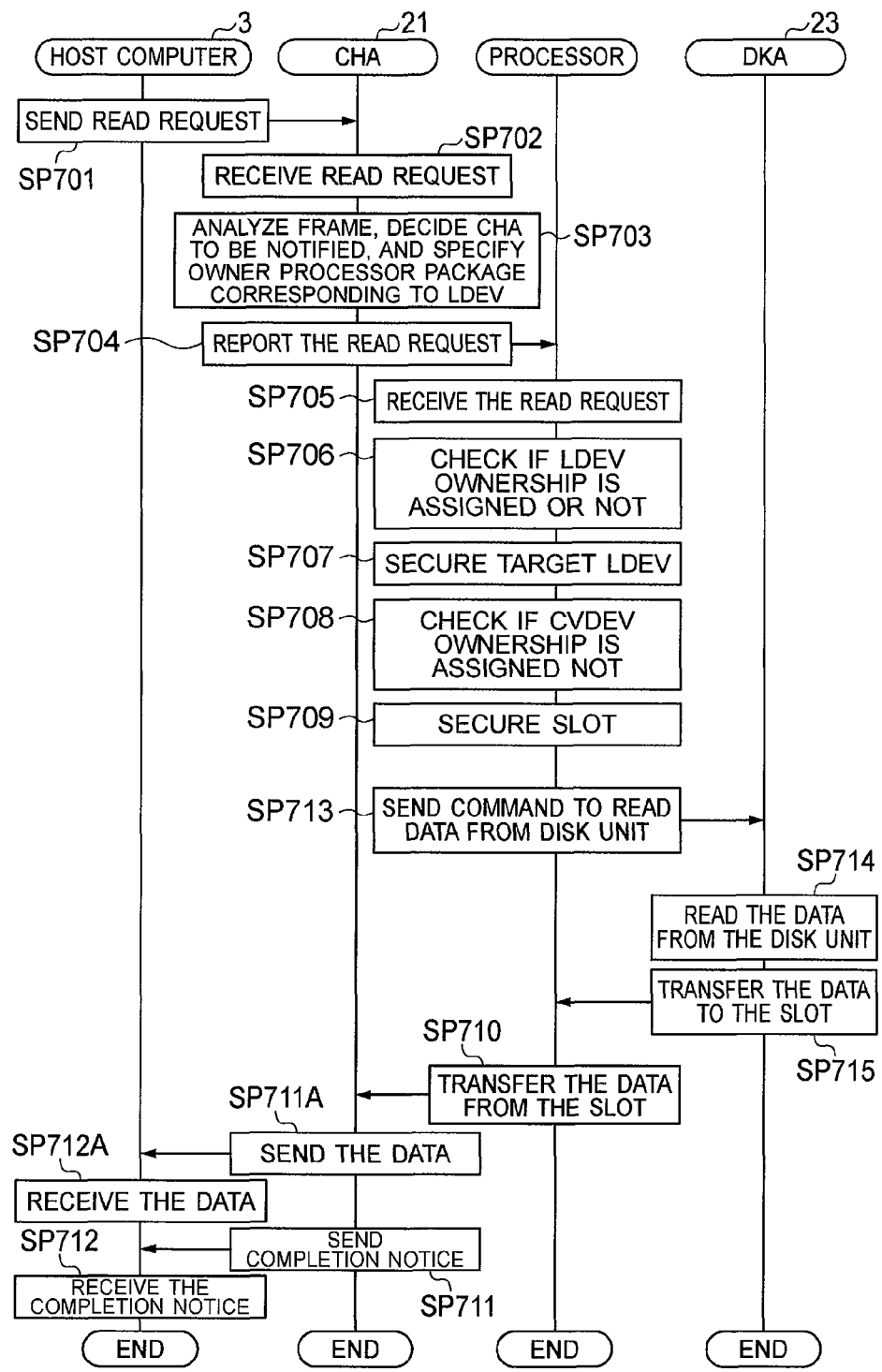
FIG. 23 is a sequence chart showing an example of a processing sequence for reading data from a volume.

FIG. 23 shows an example of a processing sequence for reading data from a volume. The host computer 3 sends a data read request to the channel adapter 21 (corresponding to CHA in the drawing) for the disk controller 12 (SP701). Next, the channel adapter 21 receives the data read request (SP702). The channel adapter 21 analyzes a frame, decides a channel adapter 21 to be notified, refers to the transfer destination search table 21F, and specifies a processor package corresponding to an LDEV for the LDEV number in the LDEV-dependent command (SP703). The specified processor package corresponds to a processor having the LDEV ownership. Subsequently, the channel adapter 21 notifies, for example, the processor package 24A of the data read request (SP704).

The processor (for example, the processor 281) for the processor package 24A receives the read request (SP705). The processor 281 refers to the ownership management table 51 stored in the local memory 29A and checks if the LDEV ownership relating to the LDEV is assigned or not (SP706). The processor 281 secures the target LDEV (SP707).

Next, the processor 281 refers to the ownership management table 51 and checks if the CVDEV ownership is assigned to itself or not (SP708). Subsequently, the processor 281 secures a slot in the cache memory 27 (SP709). The processor 281 gives a command to the disk adapter 23 to read data from the disk unit 11 (SP713).

After receiving the read command, the disk adapter 23 executes processing for reading the data from the disk unit 11 (SP714). After completing reading the data, the disk adapter 23 transfers the data to the slot (SP715); and after completion of the data transfer, the disk adapter 23 sends a completion notice to the processor 281.

The processor 281 transfers the data in the slot in the cache memory 27 to the channel adapter 21 (SP710). The channel adapter 21 sends the data to the host computer 3 (SP711A). The host computer 3 receives the data (SP712A). The channel adapter 21 sends a data read completion notice to the host computer 3 (SP711). The host computer 3 receives the notice (SP712).

(6-3) External Volume

Since processing for writing data to, and reading data from, an external volume overlaps with some of the steps for the above-described processing for wring data to, and reading data from, a volume, the difference between these processing sequences will be mainly explained below.

(6-3-1) Write Processing

Figure 24:
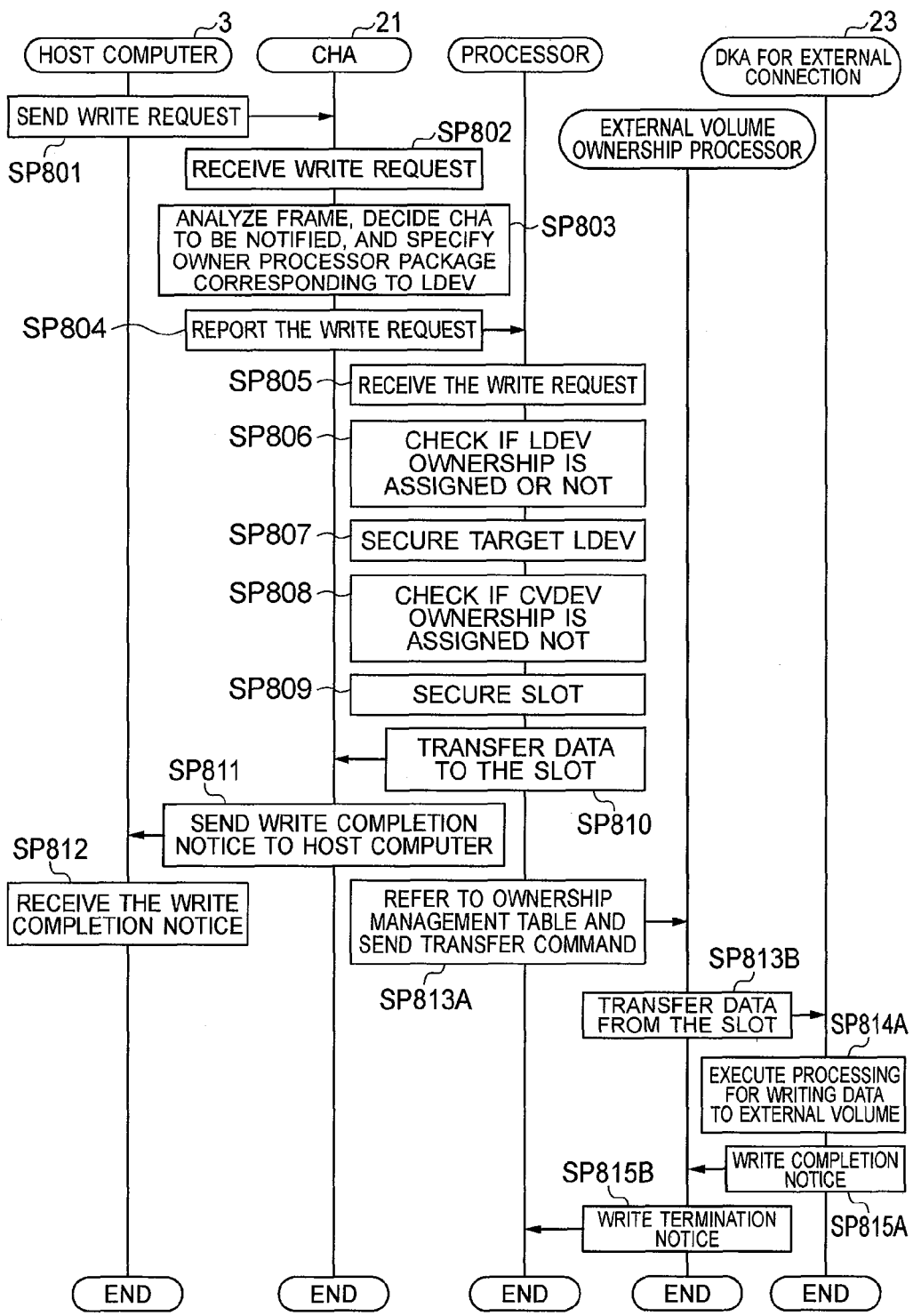
FIG. 24 is a sequence chart showing an example of a processing sequence for writing data to an external volume.

FIG. 24 shows an example of a processing sequence for writing data to an external volume. The processing for writing data to an external volume is almost the same as the processing for writing data to a volume as shown in FIG. 22, except the volume to which data is written is different. Therefore, an explanation of almost the same the processing steps has been omitted.

The processor for the processor package 24A (for example, the processor 281) refers to the ownership management table 51 and gives a transfer command to another processor (for example, the processor 284) having the external volume ownership (SP813A). The processor 284 transfers data from the slot to the disk adapter 23 for external connection (SP813B). This disk adapter 23 executes write processing on an external volume provided by the added disk unit 11 (SP814A).

The disk adapter 23 sends a write completion notice to the other processor 284 having the external volume ownership (SP815A). This processor 284 sends a write processing termination notice to the processor 281 (SP815B).

(6-3-2) Read Processing

Figure 25:
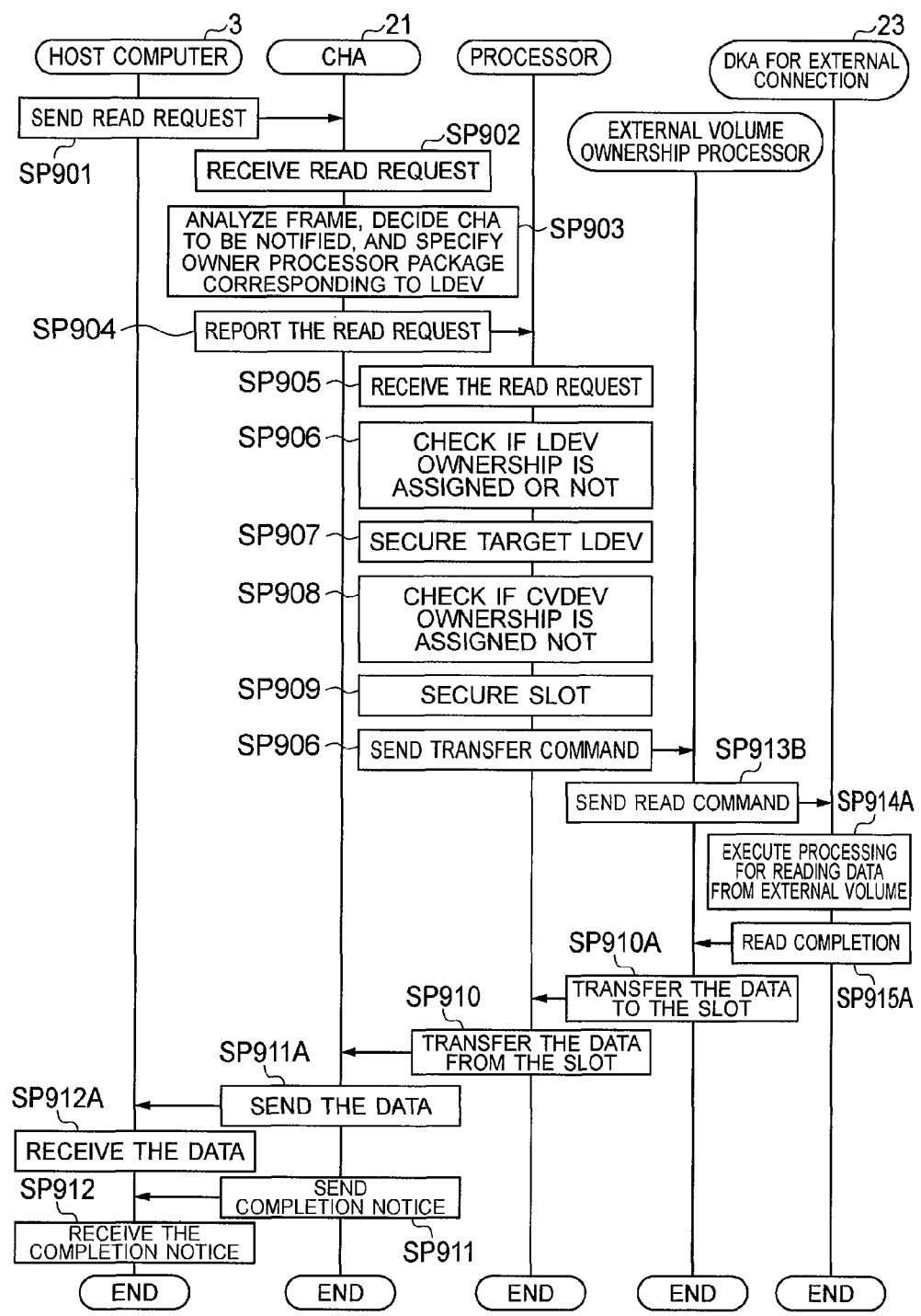
FIG. 25 is a sequence chart showing an example of a processing sequence for reading data from an external volume.

FIG. 25 shows an example of a processing sequence for reading data from an external volume. The processing for reading data from an external volume is almost the same as the processing for reading data from a volume as shown in FIG. 22, except the volume from which data is read is different. Therefore, an explanation of almost the same the processing steps has been omitted.

After securing the slot (SP909), the processor 281 for the processor package 24A refers to the ownership management table 51 and gives a transfer command to a processor for the processor package 24B (for example, the processor 284) having the external volume ownership (SP913A). The processor 284 gives a read command to the channel adapter 21 for external connection (SP913B). The channel adapter 21 executes processing for reading data from the external volume (SP914A).

This channel adapter 21 sends a read completion notice to the processor package 24B having the external volume ownership (SP915A). The processor 284 transfers the data to the slot in the cache memory 27 (SP910A). The processor 281 transfers the data in the slot to the channel adapter 21 (SP910) and then executes the processing in the same manner as the aforementioned processing (SP911A, SP912A, SP911 and SP912).

(7) Remote Copy Using Ownership (7-1) Group Creation Processing

Figure 26:
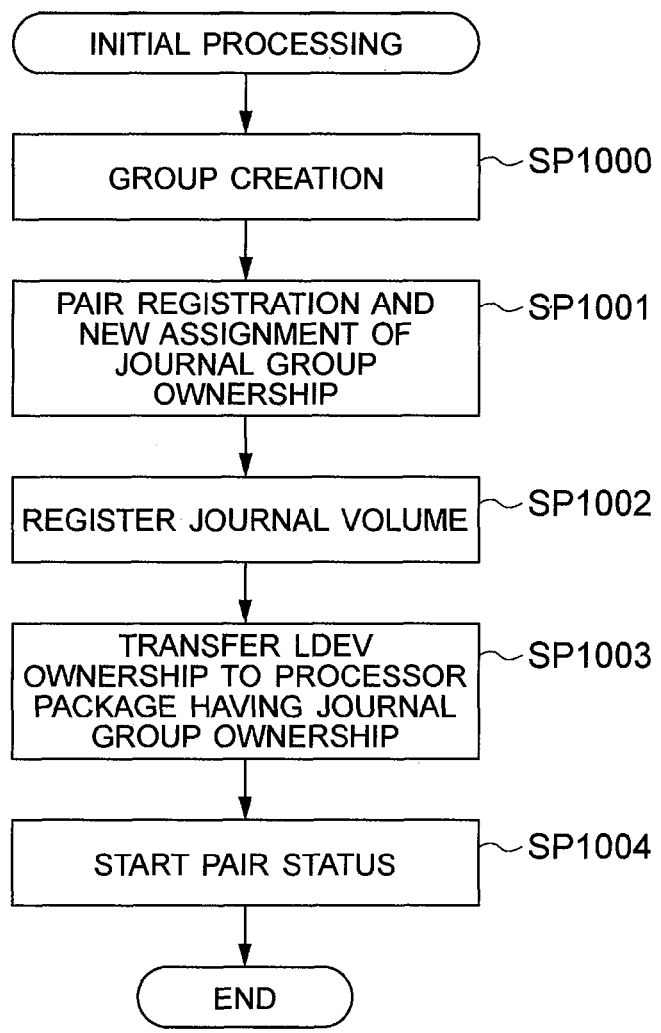
FIG. 26 is a flowchart illustrating an example of an initial processing sequence.

FIG. 26 shows initial processing executed when starting replication of data from the primary storage system 100A to the secondary storage system 100B. Incidentally, the following explanation will be given with reference to FIG. 9 described earlier.

(7-2-1) Group Creation (SP1000)

The administrator refers to group information described later in the primary storage system 100A using the aforementioned SVP and obtains the group number whose group status is UNUSED (for example, A). The administrator gives a group creation command to the primary storage system 100A by designating the group number A. After receiving the group creation command, the primary storage system 100A changes the group status of the designated group number A to NORMAL. As a result, a group with the group number A is created.

Similarly, the administrator refers to group information described later in the secondary storage system 100B and obtains the group number whose group status is UNUSED (for example, B). The administrator gives a group creation command to the primary storage system 100A by designating the secondary storage system 100B and the group number B. The primary storage system 100A transfers the received group creation command to the secondary storage system 100B. The secondary storage system 100B changes the group status of the designated group number B to NORMAL. As a result, a group with the group number B is created.

(7-2-2) Pair Registration and New Ownership Assignment (SP1001)

(7-2-2-1) Pair Registration

The administrator designates information indicating a data replication target and information indicating a data replication destination, using the SVP, and gives a pair registration command to the primary storage system 100A. The information indicating the data replication target is the group number A and primary volume number of the data replication target. The information indicating the data replication destination is the secondary storage system 100B storing the replicated data, the group number B, and the secondary volume number.

After receiving the pair registration command, the primary storage system 100A obtains the pair number, whose pair information is UNUSED, from the pair information 500; sets the pair status to UNCOPIED, sets the primary storage system number indicating the primary storage system 100A to the primary storage system number, sets the designated primary volume number to the primary volume number, sets the designated secondary storage system number to the secondary storage system number, sets the designated secondary volume number to the secondary volume number, and sets the designated group number A to the group number. The primary storage system 100A adds the above-obtained pair number to a pair set of the group information with the designated group number A and changes the volume status of the primary volume number to PRIMARY.

The primary storage system 100A designates the primary storage system number indicating the primary storage system 100A, the group number B designated by the user, the primary volume number, and the secondary volume number to the secondary storage system 100B. The secondary storage system 100B obtains the unused pair number from the pair information 500, sets the pair status to UNCOPIED, sets the primary storage system number indicating the storage system 100A to the primary storage system number, and sets the designated primary volume number to the primary volume number. Also, the secondary storage system 100B sets the secondary storage system number indicating the secondary storage system B to the secondary storage system number, sets the designated secondary volume number to the secondary volume number, and sets the designated group number B to the group number.

The secondary storage system 100B adds the above-obtained pair number to a pair set of the group information with the designated group number B and changes the volume status of the secondary volume number to SECONDARY.

(7-2-2-2) New Journal Group Ownership Assignment

The processor package 24A assigns new journal group ownership to a specified processor package 24C and updates the ownership management table 51 with regard to the ownership corresponding to this journal group.

The above-described operation is performed for all the data replication target pairs. Incidentally, The processing for registering a volume to a group and setting a logical volume pair at the same time has been explained above, but the processing for registering a volume to a group and the processing for setting a logical volume pair may be executed separately.

(7-2-3) Volume Registration and Ownership Transfer (SP1002)

(7-2-3-1) Journal Volume Registration

The administrator gives a command to the primary storage system 100A to register a volume used for storing journals (journal volume) in the above-mentioned group, using the SVP. On a side note, in the present embodiment the primary storage system 100A and the secondary storage system 100B are the storage systems 1, respectively. This command contains the group number and the logical volume number. The primary storage system 100A registers the logical volume number designated for the journal volume number of the group information with the designated group number. The primary storage system 100A changes the volume status of the volume information corresponding to that logical volume number to NORMAL.

Similarly, the administrator refers to the volume information for the secondary storage system 100B using the SVP, designates the secondary storage system 100B, the group number B, the logical volume number to be used as the journal volume, and registers the journal volume in the primary storage system 100A. The primary storage system 100A transfers a journal volume registration command to the secondary storage system 100B. The secondary storage system 100B registers the logical volume number designated for the journal volume number of the group information with the designated group number B. The secondary storage system 100B sets the volume status of the volume information corresponding to that logical volume to NORMAL.

(7-2-3-2) LDEV Ownership Transfer (SP1003)

The following content relates to the journal volume ownership. However, since the processor package 24A updates the journal volume in response to an LDEV update, the LDEV ownership is transferred to the processor package 24C having the journal group ownership in the present embodiment.

(7-2-4) Starting Data Replication Processing (SP1004)

The administrator designates the group number to start data replication processing, using the SVP, and gives a command to the primary storage system 100A to start the data replication processing. The primary storage system 100A starts initial copying and sets the copied addresses of all pieces of pair information 400 belonging to the designated group to 0. The primary storage system 100A gives a command to the secondary storage system 100B to start journal read processing and restoration processing described later. The primary storage system 100A has the remote copy program start the initial processing described later.

After the initial copying terminates, the primary storage system 100A notifies the secondary storage system 100B of the termination of the initial copying processing. The secondary storage system 100B changes the pair status of all the secondary volumes belonging to the designated group to NORMAL. The secondary storage system 100B starts the journal read processing.

(7-3) Processing upon Receiving Command

Next, the operation of the primary storage system 100A when receiving a command from the host computer 3 to write data to a volume which is a data replication target will be explained below.

(7-3-1) Access Command Reception Processing

Figure 27:
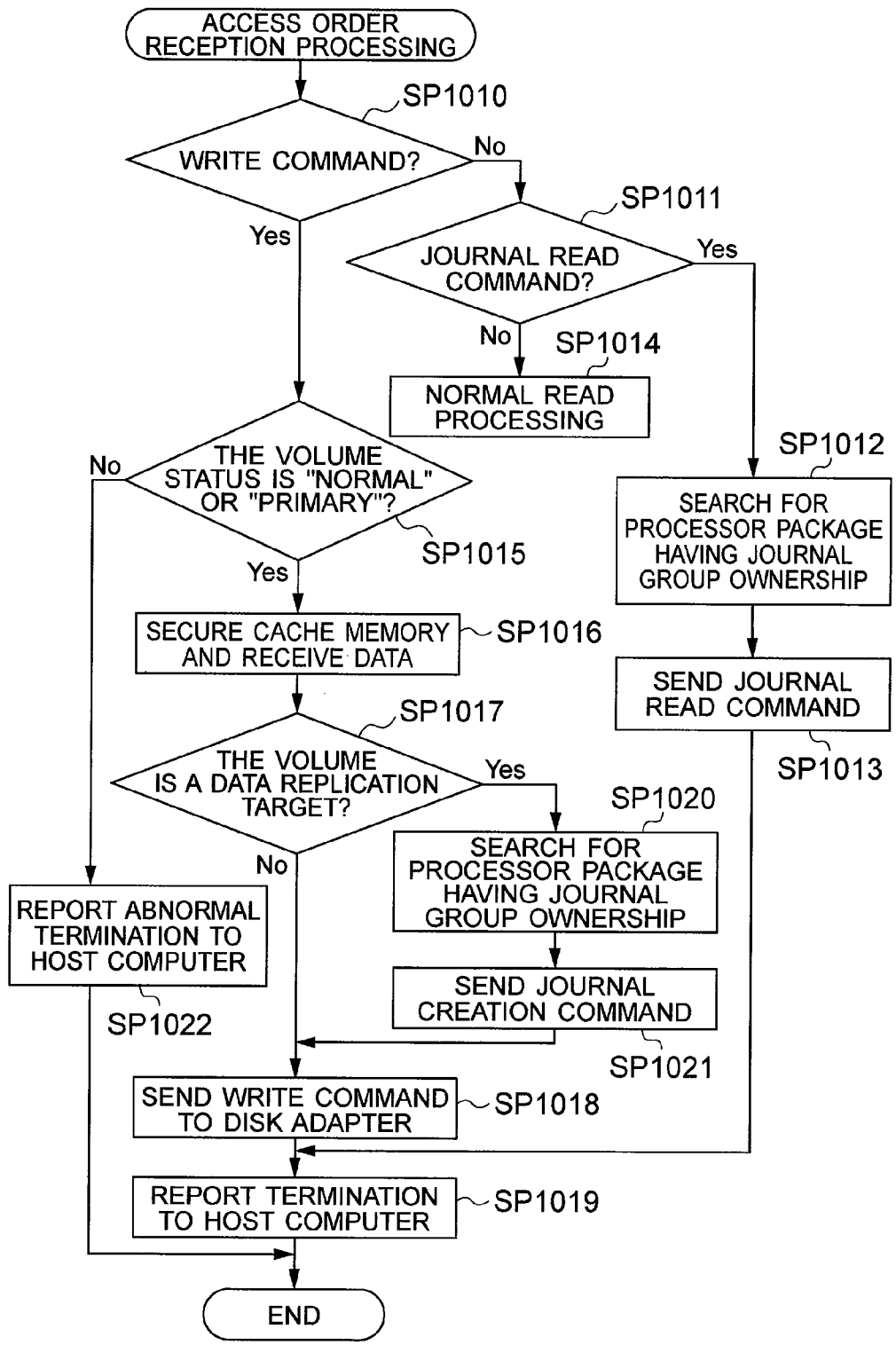
FIG. 27 is a flowchart illustrating an access command reception processing sequence.

FIG. 27 shows an access command reception processing sequence. The channel adapter 21 for the primary storage system 100A receives an access command from the host computer 3. This access command includes, for example, a command such as a read command, a write command, or a journal read command described later, as well as the logical address and data amount of a command target. The logical address in the access command will be hereinafter referred to as the logical address A, the logical volume number in the access command will be hereinafter referred to as the logical volume A, the intra-logical-volume position in the access command will be hereinafter referred to as the intra-logical-volume position A, and the data amount in the access command will be hereinafter referred to as the data amount A.

The channel adapter 21 checks if the access command is a write command or not (SP1010). If it is not the write command, the channel adapter 21 checks if this access command is a journal read command or not (SP1011); and if it is the write command, the channel adapter 21 executes step SP1015 described later. If it is determined in step SP1011 that the access command is the journal read command, the processor package 24A searches for a processor package having the journal group ownership (SP1012). The processor package 24A sends the journal read command to the processor package 24B found as the result of the search (SP1013). The processor package 24B executes journal read reception processing described later. On the other hand, if it is determined in step SP1011 that the access command is not the journal read command (for example, the access command is a read command), normal read processing is executed (SP1014).

If it is determined in step SP1010 described above that the access command is the write command, the processor package 24A refers to the volume information for the logical volume A and checks the volume status (SP1015). If the volume status of the logical volume A is neither NORMAL nor PRIMARY, the logical volume A cannot be accessed. So, the processor package A reports abnormal termination to the host computer 3 (SP1022) and terminates the processing.

If in step SP1015 the volume status of the logical volume A is NORMAL or PRIMARY, the channel adapter 21 secures the cache memory 27 and notifies the host computer 3 that it is ready for data reception. After receiving the notice, the host computer 3 sends write data to the primary storage system 100A. The channel adapter 21 receives the write data and stores it in the cache memory 27 (SP1016).

The channel adapter 21 refers to the volume status of the logical volume A and checks if the logical volume A is the data replication target or not (SP1017). If the volume status is PRIMARY in step SP1017, the logical volume A is the data replication target and, therefore, the following processing is executed. Specifically speaking, the processor package 24A searches for the processor package having the journal group ownership (step SP1020). The processor package 24A sends a journal creation command to the processor package 24B found as the result of the search. The processor package 24A has the channel adapter 21 execute journal creation processing described later (step SP1021).

If the volume status is NORMAL in the aforementioned SP1017, or after the journal creation processing terminates, the channel adapter 21 gives a command to the disk adapter 23 to write the write data to the disk unit 11 (step SP1018), it sends a termination report to the host computer 3 (SP1019). Subsequently, the disk adapter 23 stores the write data in the disk unit 11 by means of read/write processing.

(7-3-2) Journal Creation Processing

Figure 28:
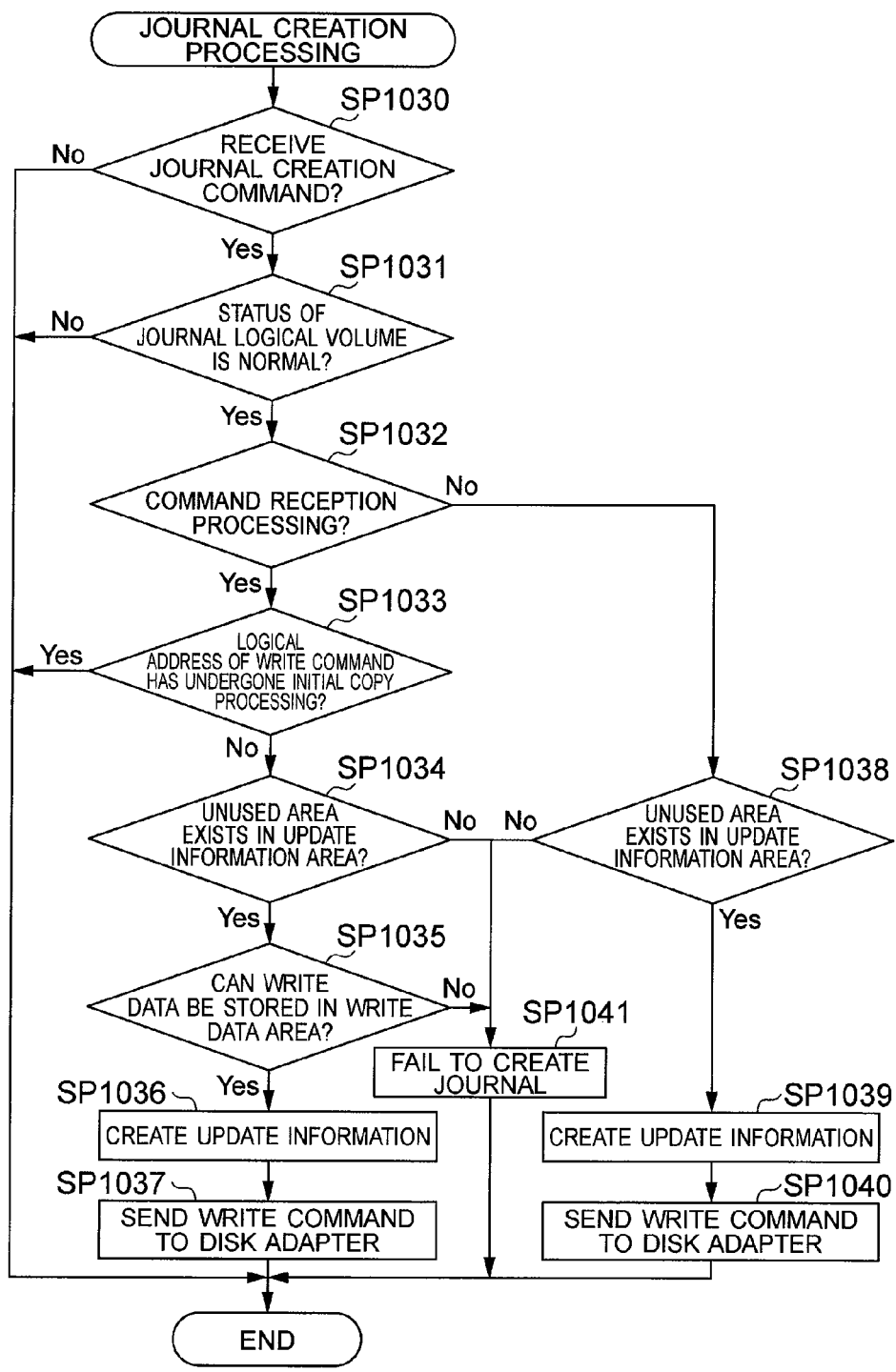
FIG. 28 is a flowchart illustrating a journal creation processing sequence.

FIG. 28 shows a journal creation processing sequence. After the channel adapter 21 receives the journal creation command (SP1030), it checks the volume status of the journal volume (SP1031). If the volume status of the journal volume is abnormal, the channel adapter 21 cannot store journals in the journal volume. Therefore, the channel adapter changes the group status to ABNORMAL and terminates the processing.

On the other hand, if it is determined in step SP1031 that the journal volume is normal, the journal creation processing is continued. How the journal creation processing proceeds varies depending on whether it is part of the initial copying processing or it is part of the command reception processing (SP1032). If the journal creation processing is part of the command reception processing, the processing proceeds to step SP1033. On the other hand, if the journal creation processing is part of the initial copying processing, the processing proceeds to step SP1038.

If the journal creation processing is part of the command reception processing, the channel adapter 21 checks if the logical address A which is the write target has undergone the initial copying processing or not (SP1033). If the pair status of the logical volume A is UNCOMPIED, the journal creation processing will be executed in the initial copying processing later and, therefore, this processing terminates without creating a journal. If the pair status of the logical volume A is BEING COPIED and the copied address is equal to or smaller than the intra-logical-address position, the journal creation processing will be executed in the initial copying processing later and, therefore, this processing terminates without creating a journal. In a case other the above-described cases, that is, if the pair status of the logical volume A is BEING COPIED and the copied address is larger than the intra-logical-address position, and if the pair status of the logical volume A is NORMAL, the initial copying processing has already been completed and, therefore, the journal creation processing continues.

Next, the channel adapter 21 checks if the journal can be stored in the journal volume or not, that is, the channel adapter 21 examines whether or not an unused area exists in a journal data area, by using pointer information (SP1034). If the latest address of the journal data in the pointer information is identical to the oldest address of the journal data, this means there is no unused area in the journal data area. So, the channel adapter 21 fails to create the journal and terminates the processing (step SP1041).

If an unused area exists in the journal data area in step SP1034, the channel adapter 21 examines, by using the pointer information, whether the write data can be stored in a write data area (SP1035). If a sum of the latest address of the write data and the data amount A is equal to or larger than the oldest address of the write data, this means that the write data cannot be stored in the write data area and, therefore, the channel adapter 21 fails to create the journal and terminates the processing (step SP1041).

If the journal can be stored in the write data area, the channel adapter 21 obtains the update number, a logical address to store the journal data, and a logical address to store the write data, and creates the journal data in the cache memory 27. Regarding the update number, a numerical value obtained by adding one to the update number, which is obtained from the group information about the target group, is set as the update number for the group information. The logical address to store the journal data is the latest address of the journal data in the pointer information, is set a numerical value obtained by adding the size of the journal data to the latest address of the journal data in the pointer information. The logical address to store the write data is the latest address of the write data in the pointer information, and is set a numerical value obtained by adding the data amount A to the latest address of the write data in the pointer information.

The channel adapter 21 sets the above-obtained numerical values, the group number, time when the write command was received, and the logical address A and data amount A in the write command to the journal data (step SP1036). For example, if the write command of data size 100 is received at a position 800 from the beginning of the storage area in the primary volume 1 belonging to group 1 in the state of the group information and the pointer information, the journal data is created. The update number in the group information is 5, the latest address of the journal data in the pointer information 600 (the size of the journal data is 100), and the latest address of the write data is 2300.

The channel adapter 21 gives a command to the disk adapter 23 to write the journal data of the journal and the write data to the disk unit 11 (step SP1037) and then normally terminates the processing.

If the journal creation processing is part of the initial copying processing, the processing proceeds to step SP1038. The channel adapter 21 checks if the journal can be created or not. The channel adapter 21 examines, by using the pointer information, whether or not an unused area exists in the journal data area (SP1038). If the latest address of the journal data in the pointer information is identical to the oldest address of the journal data, this means there is no unused area in the journal data area. So, the channel adapter 21 fails to create the journal and terminates the processing the journal data area (step SP1041).

If it is found in step SP1038 that the journal can be created, the channel adapter 21 obtains numerical values to be set to the journal data and creates the journal data in the cache memory 27. Regarding the update number, a numerical value obtained by adding one to the update number, which is obtained from the group information about the target group, is set as the update number for the group information. The logical address to store the journal data is the position of the latest address of the journal data in the pointer information, and is set a numerical value obtained by adding the size of the journal data to the latest address of the journal data in the pointer information.

The channel adapter 21 sets the logical address of the initial copying processing target to the logical address of the journal volume that stores the above-obtained numerical values, the group number, start time of this processing, the logical address of the initial copying processing target, the throughput of one time initial copying and the write data (SP1039). The channel adapter 21 gives a command to the disk adapter 23 to write the journal data to the disk unit 11 (SP1040), and then normally terminates this processing.

(7-4) Journal Read Processing

Figure 29:
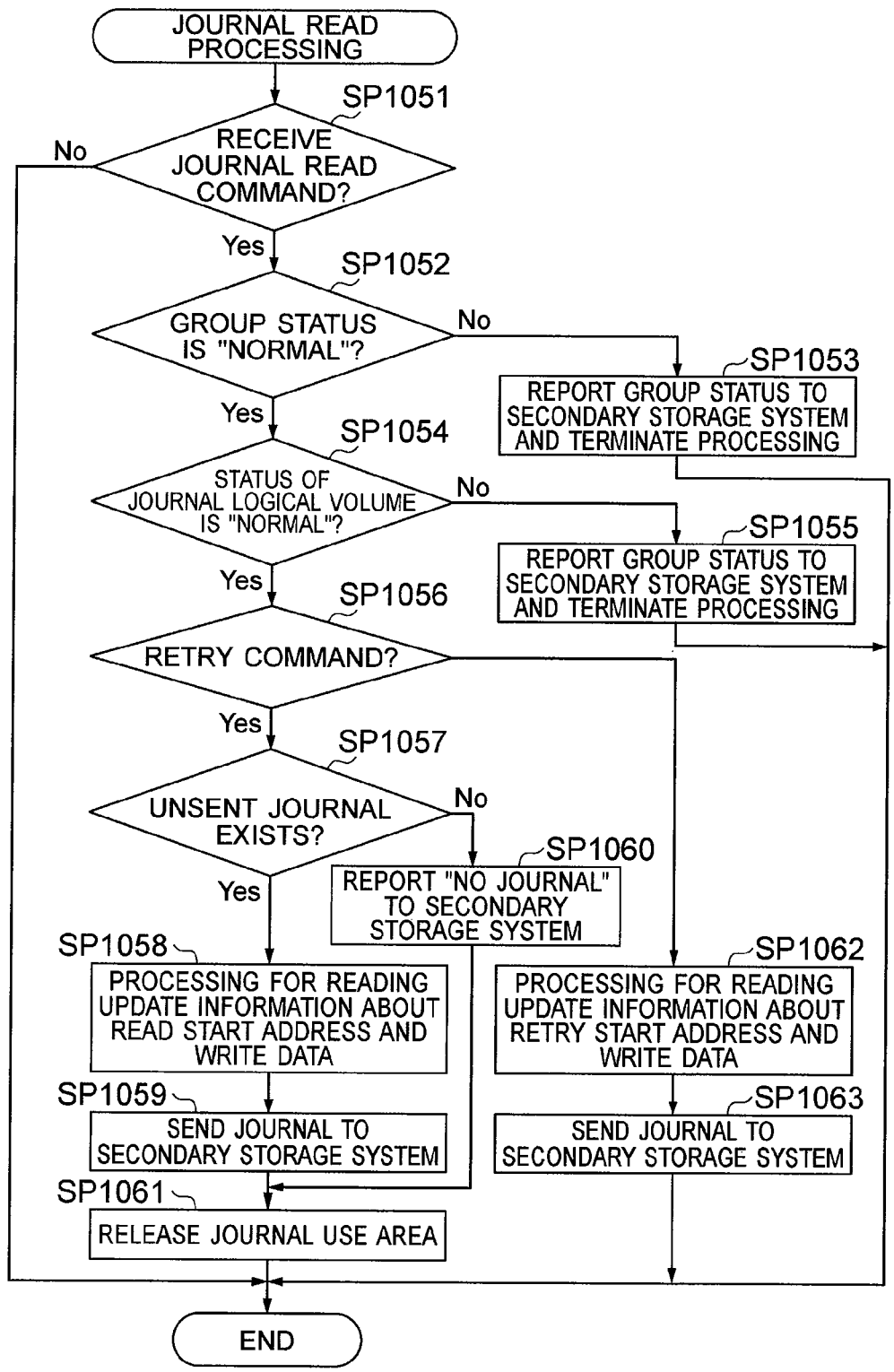
FIG. 29 is a flowchart illustrating a journal read processing sequence.

FIG. 29 shows an example of a journal read processing sequence. When the channel adapter 21 for the primary storage system 100A receives an access command from the secondary storage system 100B (SP1051), it executes step SP1052 described below. This access command contains an identifier indicating that it is a journal read command, the group number of the command target, and information indicating whether a retry command exists or not. The group number in the access command will be hereinafter referred to as the group number A.

In step SP1052, the channel adapter 21 checks if the group status of the group number A is NORMAL or not. If the group status is other than NORMAL, for example, FAILURE, the channel adapter 21 notifies the secondary storage system 1008 of the group status (step SP1053), and then terminates the processing.

If it is found in step SP1052 that the group status of the group number A is NORMAL, the channel adapter 21 examines the status of the journal volume (step SP1054). If the volume status of the journal volume not NORMAL (for example, FAILURE), the channel adapter 21 changes the group status to FAILURE, notifies the secondary storage system 1006 of that group status (SP1055), and terminates the processing. The secondary storage system 100B executes processing according to the received group status. For example, if the group status is FAILURE, the secondary storage system 1008 terminates the journal read processing. On the other hand, if the volume status of the journal volume is NORMAL, the channel adapter 21 checks if the journal read command is a retry command or not (SP1056).

If the journal read command is the retry command, the channel adapter 21 sends the journal data, which was sent last time, to the secondary storage system 1006 again. The channel adapter 21 secures a slot in the cache memory 27 and gives a command to the disk adapter 23 to read information about the journal data size from the retry start address of the pointer information to the cache memory 27. The disk adapter 23 reads the journal data from the disk unit 11 by executing read/write processing, stores the journal data in the cache memory 27, and notifies the channel adapter 21 to that effect.

After receiving the journal data read termination notice, the channel adapter 21 obtains the logical address of the write data and the size of the write data from the journal data and secures an area in the cache memory 27. Next, the channel adapter 21 gives a command to the disk adapter 23 to read the write data into the cache memory 27 (SP1062).

The disk adapter 23 reads the write data from a storage device 150 by executing the read/write processing, stores the write data in the cache memory 27, and notifies the channel adapter 21 to that effect.

After receiving the write data read termination notice, the channel adapter 21 sends the journal data and the write data to the secondary storage system 100B (SP1063). Subsequently, the channel adapter 21 releases an area in the cache memory 27 storing the journal data and then terminates the processing.

On the other hand, if it is determined in step SP1056 that the journal read command is not the retry command, the channel adapter 21 checks if an unsent journal exists or not. If an unsent journal exists, the channel adapter 21 sends the journal data to the secondary storage system 100B. The channel adapter 21 compares the read start address of the pointer information with the latest address of the journal data (SP1057).

If the read start address is identical to the latest address of the journal data, this means that all the journals have been sent to the secondary storage system 100B. So, the channel adapter 21 for the primary storage system 100A sends NO JOURNAL to the secondary storage system 100B (SP1060), and releases the storage area for the journal which was sent to the secondary storage system 100B when a journal read command was issued last time (SP1061).

The journal storage area releasing processing sets a retry start address to the oldest address of the journal data in the pointer information. If the oldest address of the journal data becomes a top address of the write data area, the oldest address of the journal data is set to 0. The oldest address of the write data in the pointer information is changed to a numerical value obtained by adding the size of the write data which was sent in response to a read journal command issued last time. If the oldest address of the write data becomes a logical address equal to or more than the capacity of the journal volume, the top address of the write data area is reduced and corrected.

On the other hand, if it is found in step 1057 that an unsent journal exists, the channel adapter 21 secures an area in the cache memory 27 and gives a command to the disk adapter 23 to read the journal data size information from the read start address of the pointer information to the cache memory 27.

The disk adapter 21 reads the journal data from the disk unit 11 by executing the read/write processing, stores the journal data in the cache memory 27, and notifies the channel adapter 21 to that effect. After receiving the journal data read termination notice, the channel adapter 21 obtains the logical address of the write data and the size of the write data from the journal data and secures the cache memory 27. Next, the channel adapter 21 gives a command to the disk adapter 23 to read the write data into the cache memory 27 (step SP1058).

The disk adapter 23 reads the write data from the disk unit 11 by executing the read/write processing, stores the write data in the cache memory 27, and notifies the channel adapter 21 to that effect. After receiving the write data read termination notice, the channel adapter 21 sends the journal data and the write data to the secondary storage system 100B (SP1059) and releases the cache memory 27 retaining the journal data. The channel adapter 21 sets the read start address to the retry start address of the pointer information and sets a numerical value obtained by adding the size of the sent journal data. The channel adapter 21 releases the storage area for the journal data which was sent to the secondary storage system 100B when processing the journal read command last time (step SP1061).

(8) Ownership Transfer

If the method for assigning the ownership as in the present embodiment is adopted, there is a possibility that the necessity to transfer the ownership, which has been assigned to a certain processor package, to another processor package may arise. The necessity to transfer the ownership as described above arises as triggered by, for example, the following events.

The first trigger event is when maintaining (replacing or removing) the processor package. On a side note, all the types of ownership in the processor package become targets. The send trigger event is when adjusting the load among the plurality of processors package. In this case, there is a possibility that only the ownership of a certain processor might be transferred. The third trigger event is when gathering the target resources to one processor package in order to enhance efficiency of processing handling the plurality of resources. The fourth trigger event is when all the processors contained in a certain processor package can no longer operate. The phrase Can No Longer Operate means, for example, the status of the configuration information is either During a deactivated transfer or maintenance deactivation.

(8-1) Concept of Preliminary Ownership and Real Ownership

Figure 30:
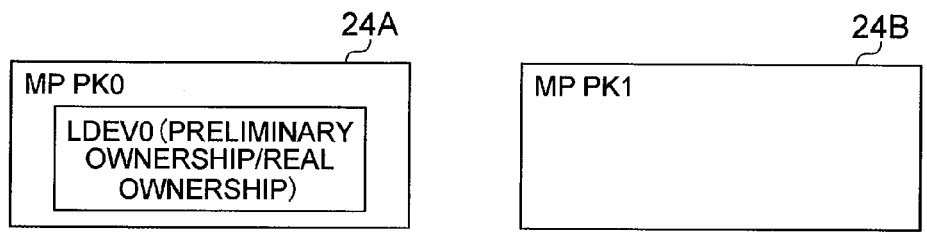
FIG. 30 shows the first state before transferring ownership.
Figure 31:
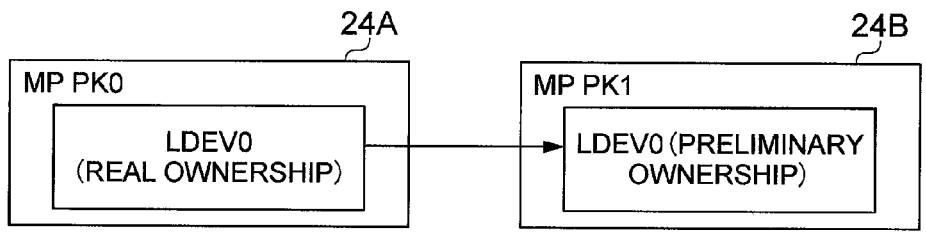
FIG. 31 shows the second state after transferring preliminary ownership.
Figure 32:
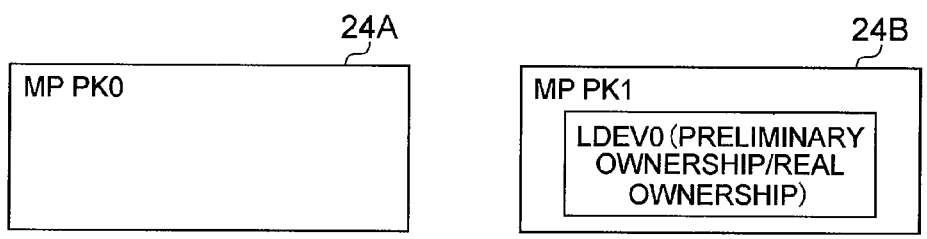
FIG. 32 is the third state after transferring real ownership.

Each of FIG. 30 through FIG. 32 shows the state where the ownership is transferred between the processors packages 24A, 24B. In the examples shown in the drawings, the ownership is transferred from the processor package 24A, which is a transfer source, to the processor package 24B which is a transfer destination.

In the present embodiment, there are two states of the ownership described above: preliminary ownership and real ownership. Firstly, the real ownership is the state of ownership in a certain resource being actually held by a processor package, while the preliminary ownership is the state of temporary ownership in a certain resource being formally assigned to a processor package before actual assignment of the ownership.

The status of the ownership of each resource makes the transition as described below according to the present embodiment. Incidentally, for ease of explanation, the following explanation will be given assuming that the ownership is assigned to each processor package. Firstly, the first state shown in FIG. 30 is the state where the processor package 24A (MPPK0) has the ownership of volume LDEV 0. The third state shown in FIG. 32 is the state where the processor package 24B (MPPK1) has the ownership of volume LDEV 0.

The second state shown in FIG. 31 indicates a transitional state where the transition is made from the first state to the third state. In the second state, the processor package 24A (MPPK0) which is the transfer source relinquishes the ownership of the volume LDEV 0, after terminating the processing executed on the volume LDEV 0, in order to smoothly proceed with the ownership transfer. The processor package 24B (MPPK1) which is the transfer destination cannot execute processing on the volume LDEV 0 until the processor package 24A relinquishes the ownership of the volume LDEV 0.

FIG. 33 shows a configuration example for the ownership management table 51 for realizing the concept of the preliminary ownership and real ownership. The ownership management table 51 to which this concept is applied has almost the same configuration, except for a part thereof, as the ownership management table 51 to which the preliminary ownership and the real ownership are not applied, the difference between these tables will be mainly focused in the following explanation.

The ownership management table 51 to which the above concept is applied manages, for example, regarding the LDEV ownership, not only the processor package number, but also information about the real ownership and the preliminary ownership for each LDEV number. The processor package number is assigned to the specified LDEV number as described above and the information according to the state of the real ownership and the preliminary ownership assigned to each LDEV corresponding to the specified LDEV number is managed.

(8-2) Preliminary Ownership Transfer

Figure 34:
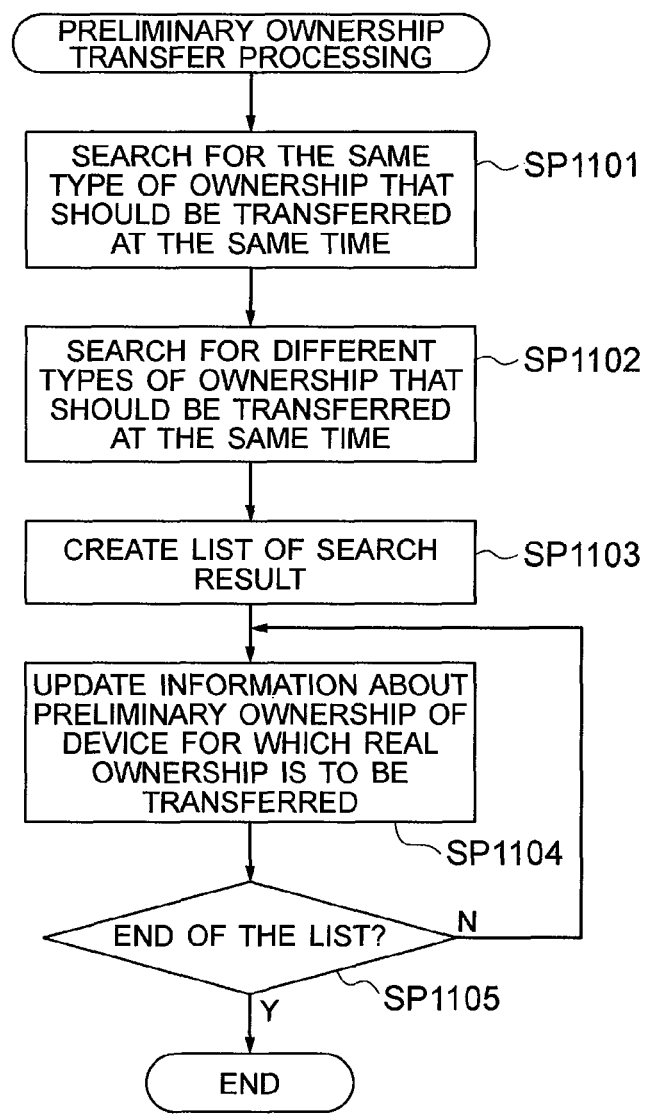
FIG. 34 is a flowchart illustrating a preliminary ownership transfer processing sequence.

FIG. 34 shows a preliminary ownership transfer processing sequence. FIG. 34 shows a processing sequence for transferring the above-described preliminary ownership. The processor package 24C refers to the ownership management table 51 (corresponding to the specific control information) in its local memory and searches for the same type of ownership to be transferred together from the transfer source to the transfer destination (SP1101).

The processor 281 for the processor package 24C refers to the ownership management table 51 in the local memory 29A and searches for the different types of ownership to be transferred together from the transfer source to the transfer destination (SP1102). The processor 281 creates a list of the above-described search result (SP1103) and update the ownership management table 51 regarding the preliminary ownership of the device for which the real ownership is to be transferred (SP1104). If it is not the end of the list, the processor 281 executes step SP1104; and if it is the end of the list, the processor 281 terminates the processing.

As described above, the processor 281 grants the preliminary ownership as the ownership to be handled in advance to the transfer destination based on the result of search for the ownership assigned to the processors included in the transfer source. The processor 281 makes the transfer destination control the channel adapter 21 in accordance with the command received from the host computer 3.

(8-3) Real Ownership Transfer

Figure 35:
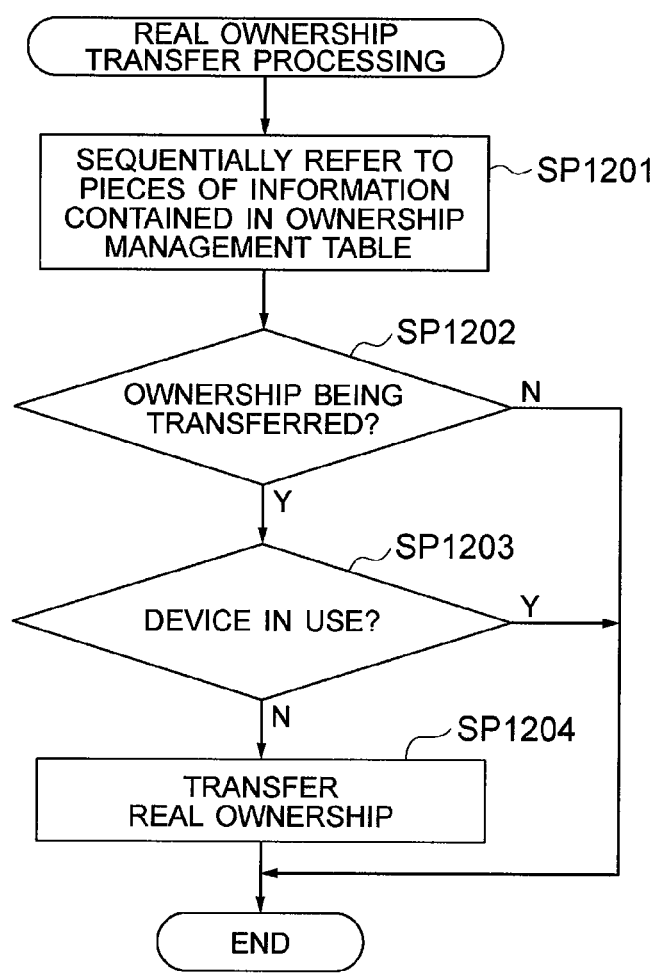
FIG. 35 is a flowchart illustrating a real ownership transfer processing sequence.

FIG. 35 shows a real ownership transfer processing sequence. This real ownership transfer processing is executed periodically. The processor 281 sequentially refers to the pieces of information in the ownership management table 51 from the local memory 29A (SP1201) and judges whether the ownership is being transferred or not (SP1202).

If the ownership is not being transferred, the processor 281 terminates the real ownership transfer processing; and if the ownership is being transferred, the processor 281 checks if the device which is the transfer target is in use or not (SP1203). If this device is in use, the processor 281 terminates the real ownership transfer processing; and if this device is not in use, the processor 281 transfers the real ownership from the transfer source to the transfer destination (SP1204).

As described above, the processor 281 has the processor 281 of the transfer source continue controlling the channel adapter 21 in accordance with a command already received from the host computer 3 until the preliminary ownership is assigned. Subsequently, as triggered by the completion of the entire processing of the already received command, the processor 281 regulates the control of the channel adapter 21 and transfers the real ownership as the actual ownership to the transfer destination.

(8-4) Cooperative Transfer of LDEV Ownership and CVDEV Ownership

In the present embodiment, VDEVs used for the management of the cache memory 27 are made to be independent as CVDEVs, which are associated with LDEVs. When using the LDEVs, data passes through the cache memory 27, so that the CVDEVs will be used. Various pieces of control information are used when using the CVDEVs in the same manner as when using the LDEVs.

For example, if the LDEV ownership and the CVDEV ownership are assigned to different processors, the processing needs to be carried over from one processor to another, thereby causing the overhead. Therefore, when transferring the LDEV ownership, it is desirable as in the present embodiment that the related CVDEV ownership should be transferred together. The real ownership is transferred in order with regard to the LDEVs and CVDEVs, which are set during the transfer, in the same manner as the transfer of the LDEV ownership. Incidentally, the corresponding relationship between the number of LDEVs and the number of CVDEVs is not limited to 1:1, but may be 1:n.

(8-5) Cooperative Transfer of Ownership

Figure 36:
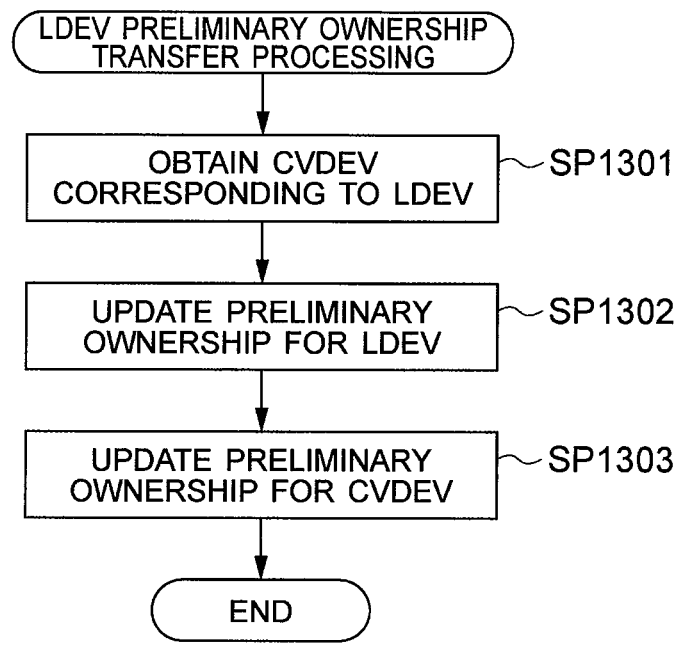
FIG. 36 is a flowchart illustrating a cooperative ownership transfer processing sequence.

FIG. 36 shows a cooperative ownership transfer sequence. The processor 281 refers to the LDEV-CVDEV number correspondence table, obtains the CVDEV number corresponding to the LDEV number, and specifies the CVDEV (SP1301). The processor 281 rewrites the ownership management table 51 with regard to the LDEV preliminary ownership (see FIG. 33) (SP1302). Next, the processor 281 rewrites the ownership management table 51 with regard to the CVDEV preliminary ownership (see FIG. 33) (SP1303).

(8-6) Assignment of LDEV Ownership

Figure 37:
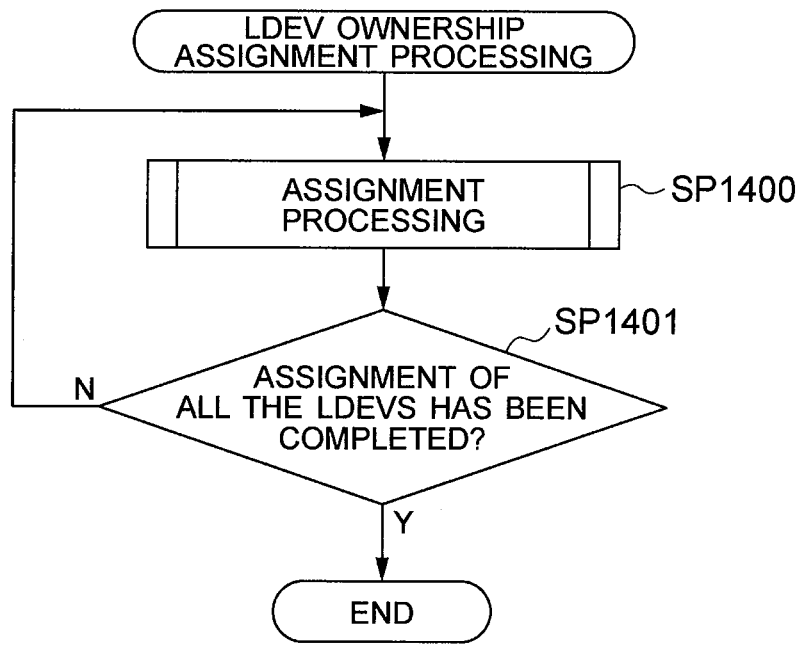
FIG. 37 is a flowchart illustrating an LDEV ownership assignment processing sequence.

FIG. 37 shows an LDEV ownership assignment processing sequence. The processor 281 executes the assignment processing on a certain LDEV (SP1400). This assignment processing will be explained below in detail. The processor 281 executes such assignment processing on all the LDEVs (SP1401).

Figure 38:
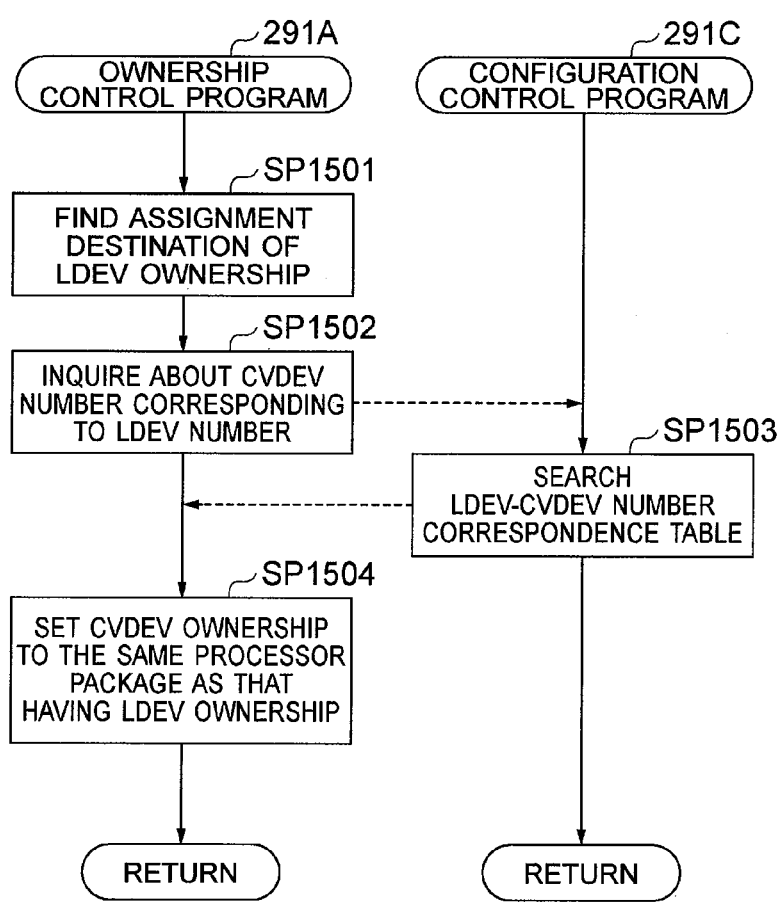
FIG. 38 is a flowchart illustrating an assignment processing sequence.

FIG. 38 shows a sequence of the assignment processing indicated in FIG. 37. A processing flow on the left side of the drawing illustrates processing executed by the ownership control program 291A and a processing flow on the right side of the drawing illustrates processing executed by the configuration control program 291C. The assignment processing shown in FIG. 38 is executed as the initial processing.

The ownership control program 291A calculates and finds an assignment destination of the LDEV ownership (SP1501). The ownership control program 291A inquires of the configuration control program 291C about the CVDEV number corresponding to the LDEV number (SP1502). The configuration control program 291C searches the LDEV-CVDEV number correspondence table 59 (SP1503) and sends a response of the search result to the ownership control program 291A. The ownership control program 291A sets the CVDEV ownership to the same processor package with the LDEV ownership (SP1504).

Figure 39:
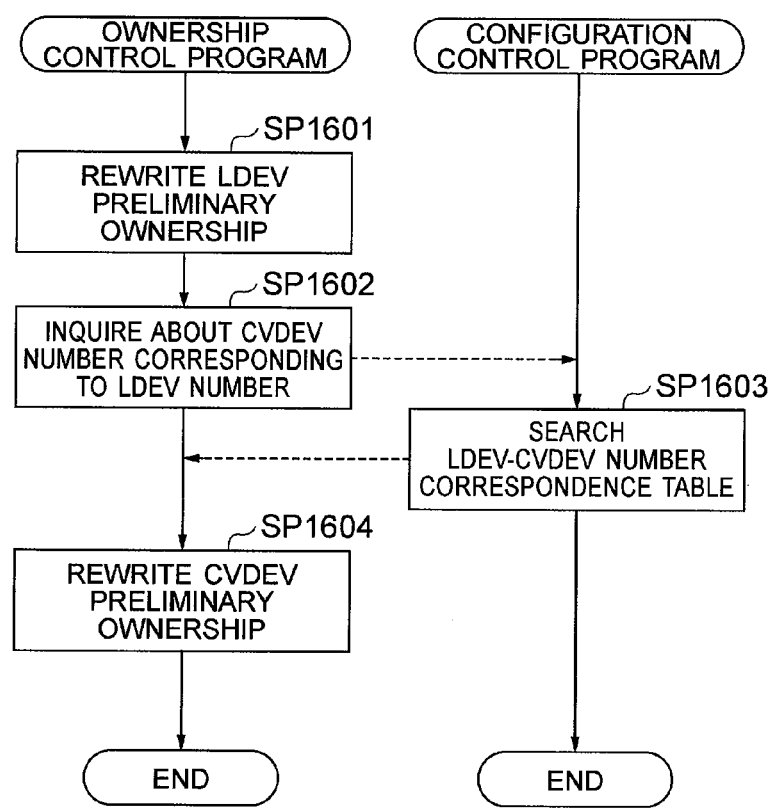
FIG. 39 is a flowchart illustrating an LDEV ownership transfer processing sequence.

FIG. 39 shows an LDEV ownership transfer processing sequence. Examples of trigger events to start the execution of this LDEV ownership transfer processing include an event when the user issues a transfer command from an external management unit, an event when a maintenance person issues a transfer command from the SVP, or an even when the failure processing program detects a failure.

The ownership control program 291A rewrites the LDEV preliminary ownership (SP1601). The ownership control program 291A inquires of the configuration control program 291C about the CVDEV number for the LDEV number (SP1602). The configuration control program 291C searches the LDEV-CVDEV number correspondence table 59 (SP1603). The ownership control program 291A rewrites the CVDEV preliminary ownership (SP1604). After the completion of the preliminary ownership transfer as described above, the transfer of the real ownership is completed by the cyclic processing as described above.

(8-7) Journal Group Ownership

Figure 40:
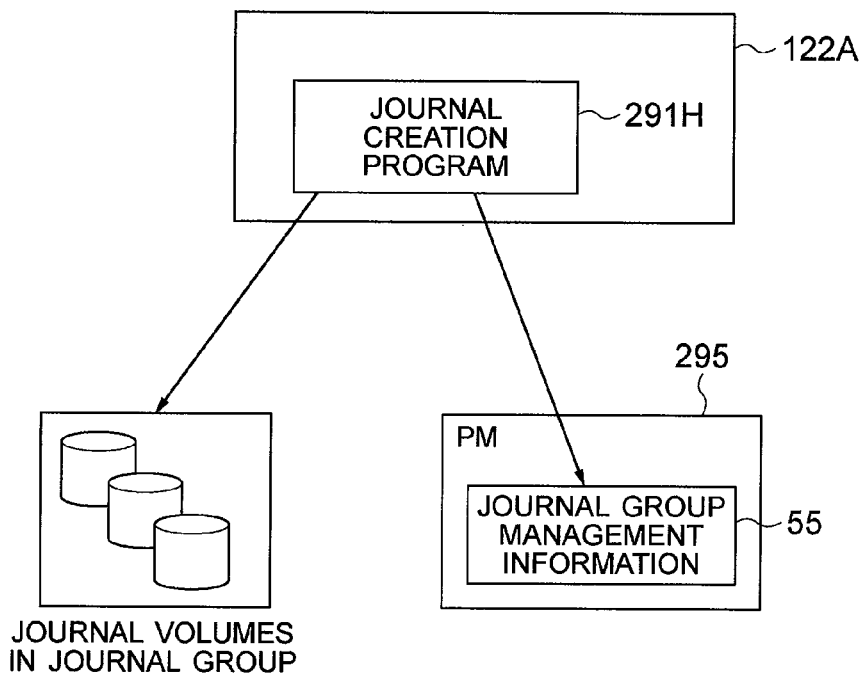
FIG. 40 is a flowchart illustrating processing executed by a journal creation program.

FIG. 40 shows processing executed by the journal creation program 291H. The processor package 24A has the journal group ownership and executes the journal creation program 291H. This journal creation program 291H accesses journal volumes in the journal group and also accesses the journal group management information 55 in the local memory 29A according to the journal group ownership.

The processor 281 having the journal group ownership executes the journal creation program 291H. When data is written to the primary volume (PVOL), the data body is written to the primary volume, while the journal creation program 291H creates the journal data and writes it to the journal volume. Therefore, the journal group ownership and the LDEV ownership are assigned to the processor 281 in the present embodiment so that the journal creation program 291H can access both the journal data and the journal volume. Incidentally, the ownership setting may be made when forming a pair of the primary volume and the secondary volume. The ownership of the journal data is the journal group ownership and the ownership of the journal volume is the LDEV ownership. Furthermore, when the journal group in which the primary volume and the secondary volume are in the pair status is to be transferred, and if the processor 281 transfers the journal group ownership, the LDEV ownership designated for the journal volume is also transferred to the same transfer destination according to the present embodiment.

Figure 41:
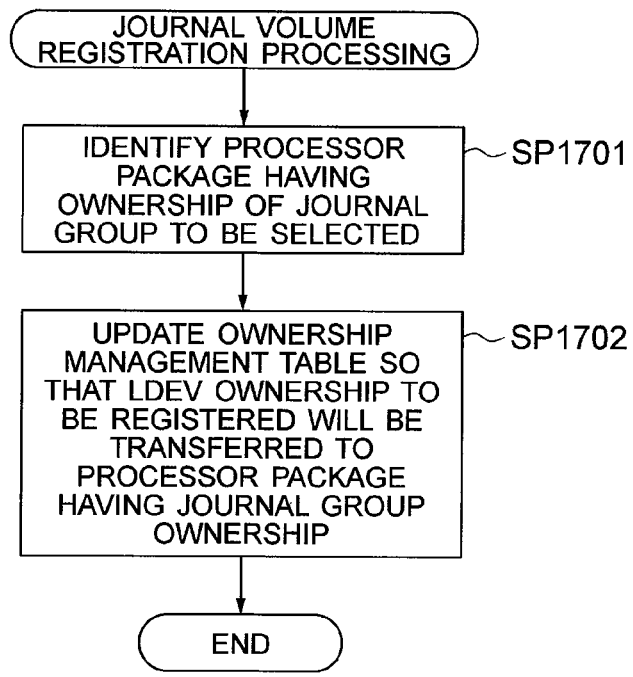
FIG. 41 is a flowchart illustrating journal volume registration processing executed when forming a pair of a primary volume and a secondary volume.

FIG. 41 shows journal volume registration processing executed when forming a pair of the primary volume and the secondary volume. Firstly, a processor package having the ownership of a journal group to be selected is specified (SP1701). The processor 281 for this processor package updates the ownership management table 51 so that the LDEV which is a registration target will be transferred to a processor package having the journal group ownership (SP1702).

Figure 42:
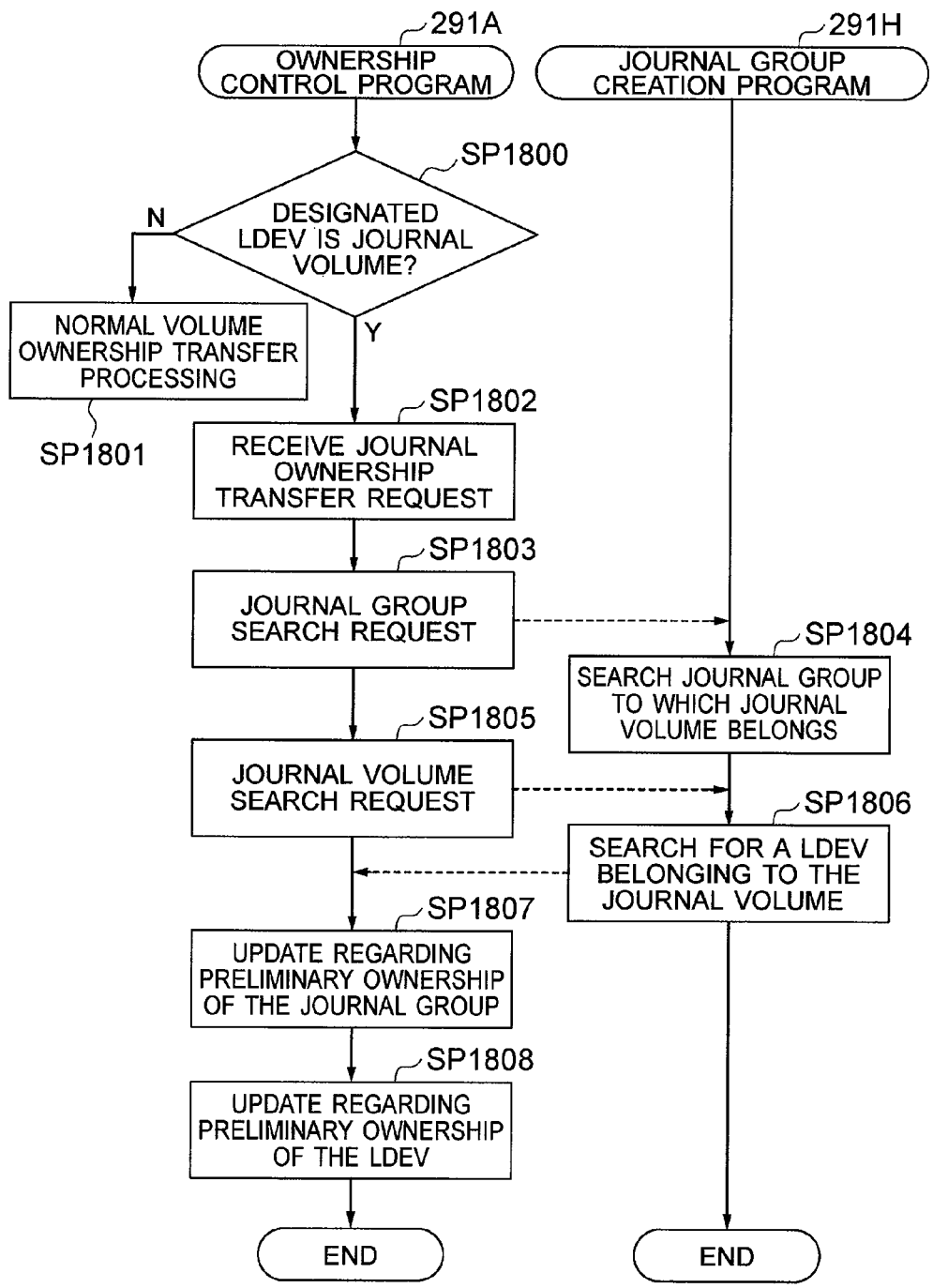
FIG. 42 is a sequence chart showing an example of a sequence for transferring ownership of an LDEV which is a journal volume.

FIG. 42 shows an example of a sequence for transferring the ownership of an LDEV which is a journal volume. The ownership control program 291A checks if the designated LDEV is a journal volume or not (SP1800). If the designated LDEV is a normal volume, the ownership control program 291A executes normal LDEV ownership transfer processing (SP1801). On the other hand, if the designated LDEV is a journal volume, the ownership control program 291A receives a ownership transfer request for the journal volume (SP1802), and then sends a journal group search request to the journal group creation program 291H (SP1803).

The journal group creation program 291H searches for the journal group to which the journal volume belongs (SP1804). The ownership control program 291A sends a journal volume search request to the journal group creation program 291H (SP1805). The journal group creation program 291H searches for the LDEV belonging to the journal group (SP1806). The ownership control program 291A updates the ownership management table 51 with regard to the preliminary ownership of the journal group (SP1807) and updates the ownership management table 51 with regard to the preliminary ownership of the LDEV (SP1808).

Figure 43:
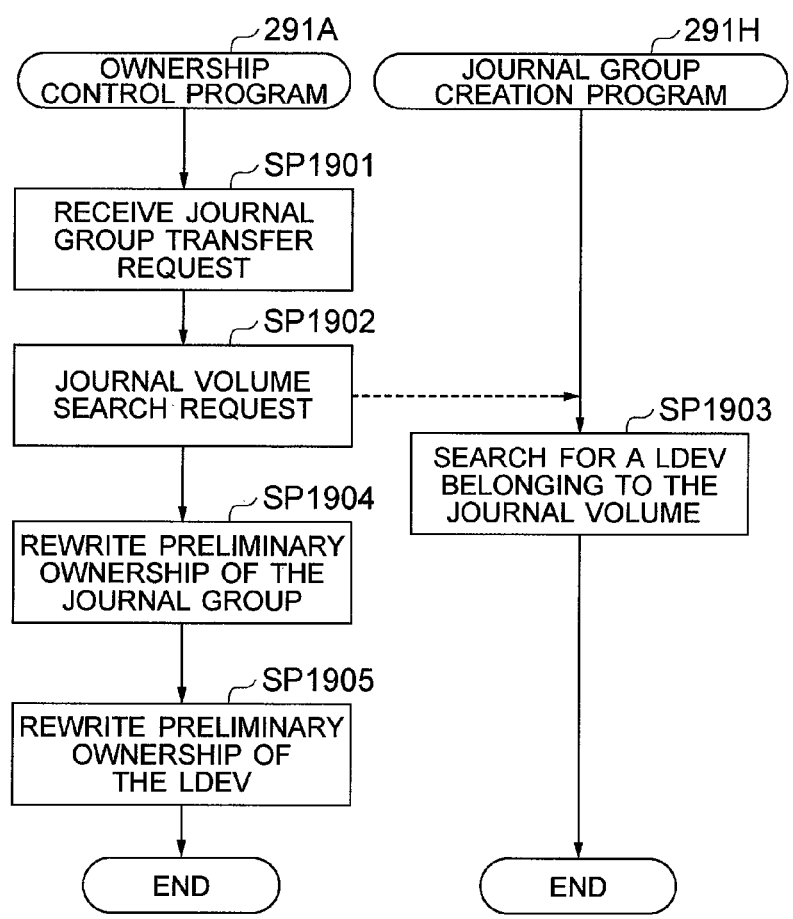
FIG. 43 is a sequence chart showing journal group ownership transfer processing.

FIG. 43 shows journal group ownership transfer processing. The ownership control program 291A receives a journal group transfer request (SP1901). The ownership control program 291A sends a search request for a journal volume belonging to the journal group to the journal group creation program 291H (SP1802). This journal group creation program 291H searches for the LDEV belonging to the journal group and sends a response to the ownership control program 291A (SP1903). The ownership control program 291A updates the ownership management table 51 with regard to the preliminary ownership of the journal group based on the obtained LDEV (SP1904), and also updates the ownership management table 51 with regard to the preliminary ownership of the LDEV (SP1905).

(9) Ownership Distribution Setting and Inhibition Setting

Management is performed according to the present embodiment by using, for example, retained amount information indicating the amount of resources retained in each processor package (or its processor) and inhibition information for controlling assignment and transfer of the ownership to the processor package (or its). This is because the use of only the number of resources when managing the amount of retained resources would result in equal treatment of different levels of influences on the load on the processor package, thereby failing to realize appropriate distribution of the load. The concept of WEIGHT for the resources is introduced in the present embodiment and the retained amounts are compared with each other using a value obtained by multiplying the resource by the WEIGHT in order to realize the appropriate load distribution among the plurality of processors package.

(9-1) Method of Using Inhibition Flag

FIG. 44 shows an example of the content of the ownership weight table 56 stored in the shared memory 25. In the present embodiment, the processor package 24A is equipped with, for example, eight processors (such as 281) and the processor packages (such as 24A) are named, for example, MPPK0 to MPPK7 respectively.

The ownership weight table 56 shows that the larger the retained amount is, the larger the load on the processor package is; and the smaller the numerical value is, the smaller the load on the processor package is. The inhibition information indicates whether the relevant processor package can be selected or not. For example, PERMITTED means the processor package can be selected; and INHIBITED means the processor package cannot be selected.

For example, when a certain processor package MPPK6 is selected now, a processor package to be selected when transferring the ownership would be not a processor package MPPK2, but a processor package MPPK1 whose retained amount is small and whose inhibition information is PERMITTED. This is because the processor package MPPK2 has the second smallest retained amount next to the processor package MPPK6, but its inhibition information is INHIBITED so that it cannot be selected.

On a side note, in order to set the ownership weight table 56 so as to prevent, for example, the selection of a specified processor package MPPK2 due to circumstances, the retained amount may be simply set as an infinite value as shown in FIG. 45 instead of providing the above-described inhibition information and setting INHIBITED as the inhibition information.

The processor package 24A sets the target resource at the top from the plurality of resources such as the processor packages MPPK0 to MPPK7. The processor package 24A checks if a processor package is designated in the reference information in the local memory 29A or not.

If the processor package is not designated, the processor package 24A selects a processor package with the smallest retained amount from processors of the same module as the target resource and whose inhibition information is PERMITTED; and the processor package 24A updates the entity information with the selected processor package. If the processor package is designated, the processor package 24A updates the entity information with the designated processor package.

The processor package 24A increases the retained amount with respect to the above-mentioned processor package and reflects the increased result in the retained amount information in the ownership weight table 56. The processor package 24A proceeds to the next resource as the target resource, checks if the assignment of the ownership to all the resources has been completed or not, and continues the above-described processing until the completion of the ownership assignment to all the resources.

(9-2) Inhibition Setting
(9-2-1) Designation of Transfer Destination According to Operating Ratio The present embodiment may be configured so that the processor package 24A accepts the ownership only when the relevant operating ratio is low according to the processor operation information 58 in the shared memory 25. The processor operation information 58 manages the operating ratio of the processor 281 or the processor package (such as 24A) to which the processor 281 belongs as described above.

(9-2-2) Ownership Transfer Inhibition

FIG. 46 shows an example of the content of the ownership weight table 56 including the setting for inhibiting the transfer of the ownership. Firstly, the background of this setting is that depending on the configuration, it might possibly be better to not freely transfer the ownership currently held by a certain processor package to another processor package. So, the ownership weight table 56 may be configured so that whether the transfer of ownership is permitted or not can be set to each processor package (or its processor). Even if the processor package (or its processor) to which the above-described transfer inhibition setting is made receives a command to transfer the ownership, the ownership will not be transferred. Incidentally, in this case, the ownership transfer information in the ownership weight table 56 is set to PERMITTED if the ownership transfer is permitted; and the ownership transfer information is set to INHIBITED if the ownership transfer is inhibited.

(9-3) Ownership Transfer Inhibition Setting

The processor package 24A sets the target resource at the top from the plurality of resources such as the processor packages MPPK0 to MPPK7. The processor package 24A checks if a processor package is designated in the reference information or not.

If the processor package is not designated, the processor package 24A selects a processor package with the smallest retained amount from processors of the same module as the target resource and whose inhibition information is PERMITTED; and the processor package 24A updates the entity information with the selected processor package. If the processor package is designated, the processor package 24A updates the entity information with the designated processor package.

If the operating ratio of its processor (such as 281) is lower than a specified threshold value based on the processor operation information 58 in the shared memory 25, the processor package 24A assigns the ownership.

The processor package 24A increases the retained amount with respect to the above-mentioned processor package and reflects the increased result in the retained amount information in the ownership weight table 56 (SP2105). The processor package 24A proceeds to the next resource as the target resource (SP2106) and checks if the assignment of the ownership to all the resources has been completed or not (SP2107). The processor package 24A continues the above-described processing until the completion of the ownership assignment to all the resources.

(10) Advantageous Effects of the Present Embodiment

According to the present embodiment as described above, the processor 281 for the plurality of processors packages (such as 24A) incorporatively transfers a plurality of types of related pieces of ownership based on the specific control information for managing the ownership for accessing retained or added resources for each of the plurality of types of resources.

The above-described configuration enables collective management of the pieces of ownership which should be associated with each other, and cooperative transfer of the pieces of ownership which should be consolidated. As a result, access time for the processor 281 to access the plurality of types of resources can be reduced and access by the processor 281 to the plurality of types of resources can be controlled efficiently, thereby enhancing the throughput.

The plurality of types of resources in the present embodiment include combinations of any of the following: an LDEV corresponding to the first volume as a volume provided by the disk unit 11; a CVDEV as the second volume provided by the cache memory 26 for temporarily storing data from the host computer 3; an external volume provided by another added disk unit 11 to the host computer 3; a journal volume to which journal data about data written to the above-mentioned LDEV (the first volume) is written; and at least one port 121B on the channel adapter 21 to which the host computer 3 is connected.

As a result, the access time for the processor 281 to access the plurality of types of resources such as the LDEV and the CVDEV can be reduced and access by the processor 281 to the plurality of types of resources such as the LDEV can be controlled efficiently, thereby enhancing the throughput.

The storage system 1 according to the present embodiment includes the shared memory 26 storing another control information for managing the plurality of types of ownership. Furthermore, the processor package (such as 24A) includes the local memory (such as 29A) for storing the specific control information. If the specific control information is identical to the other control information, the processor 281 uses the specific control information stored in the local memory 29A; and if the specific control information is not identical to the other control information, the processor 281 uses the other control information stored in the shared memory 26.

The processor package (such as 24A) according to the present embodiment has, separately from the specific control information, specific management information about the update history of the specific control information in the local memory (such as 29A). Furthermore, the shared memory 26 has, separately from the other control information, another management information about the update history of the other control information. If it is found as a result of comparison between the specific management information and the other management information that the specific management information is older than the other control information, the processor 281 to 284 copies the other control information from the shared memory 26 to the local memory 29A to 29D and overwrites the other control information.

The channel adapter 21 according to the present embodiment includes: the memory 21C for storing the transfer destination search table 21F for managing the corresponding relationship between the volume and the processor package (such as 24A) to be allocated to the volume; and the LR 21D for controlling access by the processor 281 for the processor package (such as 24A) to the volume based on the transfer destination search table 21F. The processor 281 controls access to the volume (LDEV) by updating the transfer destination search table 21.

As the above-described configuration is employed, access can be controlled efficiently based on the transfer destination search table 21F if the processor 281 updates the transfer destination search table 21F.

The shared memory 26 according to the present embodiment includes: the shared cache area being accessible by all the processors 281 included in the plurality of processors package (such as 24A) is permitted; the exclusive cache area regarding which access by the processor 281 having the ownership is permitted and access by the processing having no ownership is not permitted; and the non-cache area regarding which access by all the processors (such as 281) included in the plurality of processors package (such as 24A) is not permitted. If each processor 281 updates data in the shared cache area, that processor sends an update message to all the processors; and if the processor with no ownership sends an update message to the processor with the ownership when data in the exclusive cache area is updated. Incidentally, the exclusive cache area corresponds to the CVDEV as the aforementioned second volume.

The storage system 1 according to the present embodiment includes the management unit (SVP: Service Processor) for setting the ownership relating to the LDEV as the first volume at the time of the initial setting. The processor 281 to which the ownership of the first volume is assigned automatically has the setting of the CVDEV as the second volume and the port ownership.

According to the present embodiment, the processor 281 searches for different types of ownership that should be transferred at the same time and transfers the different types of ownership found by the search, as the preliminary ownership which is ownership to be handled in advance, from the transfer source to the transfer destination, thereby having the processor 281, which is the transfer destination, control the channel adapter 21 in accordance with on a command received from the host computer 3. Furthermore, the processor 281 has the processor 281 which is the transfer source continue controlling the channel adapter 21 in accordance with a command already received from the host computer 3 until the preliminary ownership is assigned; and as triggered by the completion of the entire processing of the already received command, the processor 281 regulates the control of the channel adapter 21 and transfers the real ownership as actual ownership to the transfer destination.

According to the present embodiment, the channel adapter 21 includes: the memory 21C, which stores the transfer destination search table 21F for managing the corresponding relationship between the plurality of types of resources and the ownership for each resource; and the local router (the transfer control unit) 21D for transferring a command received from the host computer 3 to the processor package 24B to execute processing, and also transferring data from the host computer 3 based on the transfer destination search table 21F.

According to the present embodiment, the processor 281 transfers the LDEV ownership relating to the first volume and the CVDEV ownership relating to the second volume by having them cooperate with each other. As a result, the same processor 291 obtains ownership of the related two types of resources. Therefore, access control is simplified, thereby enhancing the throughput.

According to the present embodiment, the processor 281 transfers the journal group ownership and the LDEV ownership relating to the first volume by having them cooperate with each other. As a result, the same processor 291 obtains ownership of the related two types of resources. Therefore, access control is simplified, thereby enhancing the throughput.

According to the present embodiment, the processor 281 applies the calculated weight to each of the plurality of resources based on specified standards and decides a resource to which the ownership is to be transferred according to load information based on the weight. As a result, it is possible to prevent biased assignment of the ownership.

(11) Other Embodiments

The above-described embodiments are examples given for the purpose of describing the present invention, and it is not intended to limit the invention only to these embodiments. Accordingly, the present invention can be utilized in various ways unless the utilizations depart from the gist of the invention. For example, processing sequences of various programs have been explained sequentially in the embodiments described above; however, the order of the processing sequences is not particularly limited to that described above. Therefore, unless any conflicting processing result is obtained, the order of processing may be rearranged or concurrent operations may be performed.

REFERENCE SIGNS LIST

1 Storage system
3 Host computer
11 Disk unit
21 Channel adapter
21D LR

21F Transfer destination search table
23 Disk adapter
24A to 24D Processor packages
26 Shared memory
27 Cache memory
51 Ownership management table
121B Port
281 to 284 Processors
295 Package memory area

The invention claimed is:

1. A storage system comprising:
a disk device for providing a volume for storing data to a host system;
a channel adapter for writing data from the host system to the disk device via a cache memory;
a disk adapter for transferring data to and from the disk device; and
at least one processor package including a plurality of processors for controlling the channel adapter and the disk adapter;
wherein the processor package includes a processor for incorporatively transferring related types, of a plurality of types, of ownership for each of a plurality of types of resources based on specific control information for managing each of the types of ownership and consolidating the related types of ownership to one processor package,
wherein the storage system further comprises a shared memory for storing another control information for managing the plurality of types of ownership,
wherein the processor package includes a local memory for storing the specific control information, and
wherein if the specific control information is identical to the other control information, the processor uses the specific control information stored in the local memory; and if the specific control information is not identical to the other control information, the processor uses the other control information stored in the shared memory.

2. The storage system according to claim 1, wherein the processor package comprises, separately from the specific control information, specific management information about an update history of the specific control information in the local memory;
wherein the shared memory includes, separately from the other control information, another management information about an update history of the other control information; and
wherein if it is found as a result of comparison between the specific management information and the other management information that the specific control information is older than the other control information, the processor copies the other control information from the shared memory to the local memory and overwrites the specific control information.

3. The storage system according to claim 2, wherein the channel adapter includes:
a memory for storing a transfer destination search table for managing a corresponding relationship about a processor package to be allocated to the volume, from the plurality of processors packages; and
a local router processor (LR) for controlling access to the volume by the processor for the processor package based on the transfer destination search table; and
wherein the processor controls access to the volume by updating the transfer destination search table.

4. The storage system comprising:
a disk device for providing a volume for storing data to a host system;
a channel adapter for writing data from the host system to the disk device via a cache memory;
a disk adapter for transferring data to and from the disk device; and
at least one processor package including a plurality of processors for controlling the channel adapter and the disk adapter;
wherein the processor package includes a processor for incorporatively transferring related types, of a plurality of types, of ownership for each of a plurality of types of resources based on specific control information for managing each of the types of ownership and consolidating the related types of ownership to one processor package,
wherein the plurality of types of resources include a combination of any of the following:
a first volume as the volume provided by the disk device;
a second volume provided by the cache memory for temporarily storing data from the host system;
an external volume provided by another added disk device to the host system;
a journal volume to which journal data relating to the data written to the first volume is written; and
at least one port on the channel adapter to which the host system is connected,
wherein the shared memory includes:
a shared cache area, for which access is permitted, by all the processors included in the plurality of processor packages;
an exclusive cache area, for which access is permitted, by the processor having the ownership and access is not permitted by the processor without the ownership; and
a non-cache area for which access is not permitted by all the processors included in the plurality of processor packages;
wherein when each processor updates data in the shared cache area, it sends a message of the update to all the processors; and
the processor with the ownership sends a message of an update to data in the exclusive cache to the processor without the ownership when the data in the exclusive cache area is updated.

5. The storage system according to claim 4, wherein the exclusive cache area corresponds to the second volume.

6. A storage system comprising:
a disk device for providing a volume for storing data to a host system;
a channel adapter for writing data from the host system to the disk device via a cache memory;
a disk adapter for transferring data to and from the disk device; and
at least one processor package including a plurality of processors for controlling the channel adapter and the disk adapter;
wherein the processor package includes a processor for incorporatively transferring related types, of a plurality of types, of ownership for each of a plurality of types of resources based on specific control information for managing each of the types of ownership and consolidating the related types of ownership to one processor package,
wherein the processor searches for different types of ownership to be transferred at the same time and transfers the different types of ownership found by the search, as preliminary ownership that is ownership to be handled in advance, from a transfer source to a transfer destination, so that the processor includes the transfer destination control of the channel adapter in accordance with a command received from the host system; and the processor package includes a second processor included in the transfer source which continues controlling the channel adapter in accordance with a command already received from the host system until the preliminary ownership is assigned; and as triggered by the completion of the entire processing of the already received command, the second processor regulates the control of the channel adapter and transfers real ownership as actual ownership to the transfer destination.

7. The storage system according to claim 6, wherein the channel adapter includes a memory for storing a transfer destination search table for managing, for each of the plurality of types of resources, the corresponding relationship between the plurality of types of resources and the ownership; and a transfer control unit for transferring a command received from the host system to the processor package to be processed and transferring data from the host system based on the transfer destination search table.

8. The storage system according to claim 6, wherein the processor incorporatively transfers ownership relating to the first volume and ownership relating to the second volume.

9. The storage system according to claim 6, wherein the processor incorporatively transfers the journal group ownership and ownership relating to the first volume.

* * * * *